United States Patent [19]

Matsuba et al.

[11] Patent Number: 5,255,347
[45] Date of Patent: Oct. 19, 1993

[54] NEURAL NETWORK WITH LEARNING FUNCTION

[75] Inventors: Ikuo Matsuba, Zama; Ichirou Sugita, Tokyo, both of Japan

[73] Assignees: Hitachi, Ltd.; Hitachi Keiyo Engineering Co., Ltd., both of Tokyo, Japan

[21] Appl. No.: 690,517

[22] Filed: Apr. 23, 1991

[30] Foreign Application Priority Data

Apr. 25, 1990 [JP] Japan .................................. 2-107580

[51] Int. Cl.$^5$ ................................................ G10L 7/08
[52] U.S. Cl. ......................................... 395/23; 395/22; 395/24
[58] Field of Search ............................ 395/22, 23, 24

[56] References Cited

U.S. PATENT DOCUMENTS

| | | | |
|---|---|---|---|
| 4,876,731 | 10/1989 | Loris et al. ........................... | 395/21 |
| 4,941,122 | 7/1990 | Weideman ........................... | 395/22 |
| 5,040,214 | 8/1991 | Grossberg et al. .................. | 395/22 |

OTHER PUBLICATIONS

Rumelhart et al, "Learning Internal Representaitons by Error Propagation," Parallel Distributed Processing, vol. 1, Foundations, Rumelhart and McClelland, eds. MIT Press, Cambridge, Mass. (1986), pp. 318-362.

Lippmann, Richard P., "Pattern Classification Using Neural Networks," IEEE Communications Magazine, Nov., 1989, pp. 47-64.

*Primary Examiner*—Allen R. MacDonald
*Assistant Examiner*—Tariq R. Hafiz
*Attorney, Agent, or Firm*—Fay, Sharpe, Beall, Fagan, Minnich & McKee

[57] ABSTRACT

A neural network system capable of performing integrated processing of a plurality of information includes a feature extractor group for extracting a plurality of learning feature data from learning data in a learning mode and a plurality of object feature data from object data to be processed in an execution mode, and an information processing unit for learning features of the learning data, based on the plurality of learning feature data from the feature extractor group and corresponding teacher data in the learning mode, and determining final learning result data from the plurality of object feature data from the feature extractor group in accordance with the learning result, including a logic representing relation between the plurality of object feature data in the execution mode.

7 Claims, 23 Drawing Sheets

LEARNING PROCESS

RECOGNIZING PROCESS

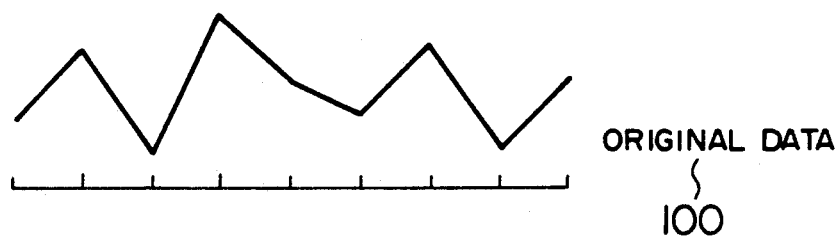
FIG. 9A — ORIGINAL DATA 100
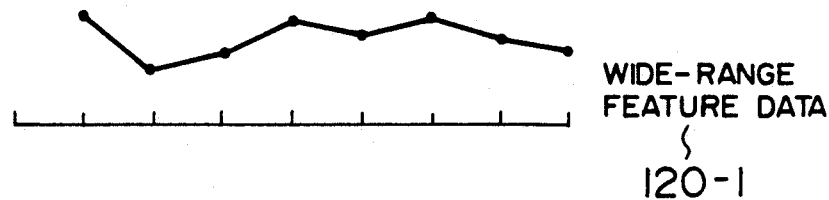
FIG. 9B — WIDE-RANGE FEATURE DATA 120-1
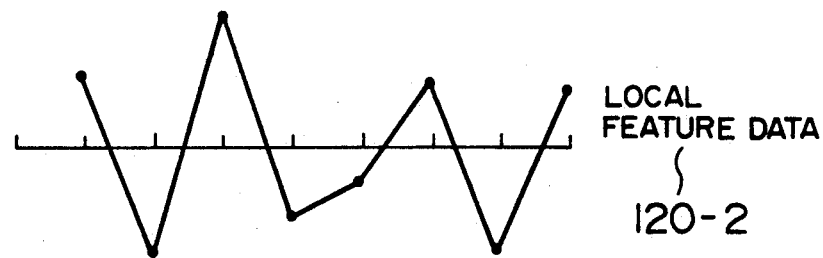
FIG. 9C — LOCAL FEATURE DATA 120-2

NOISE DATA FOR EACH SYNAPSE CONNECTION

NOISE DATA DEPENDENT ON NUMBER OF LEARNING CYCLES

INTERMEDIATE LAYER 3×3

INTERMEDIATE LAYER 4×4

INTERMEDIATE LAYER 5×5

FIG. 25A
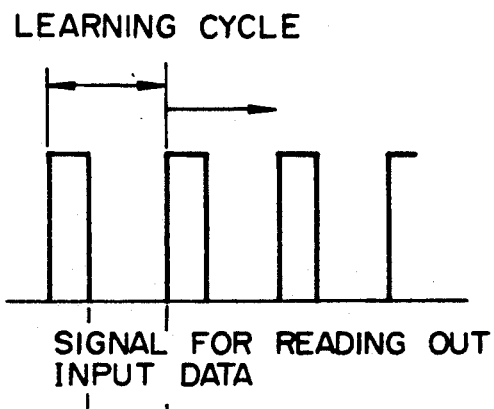
SIGNAL FOR READING OUT
INPUT DATA
FIG. 25B
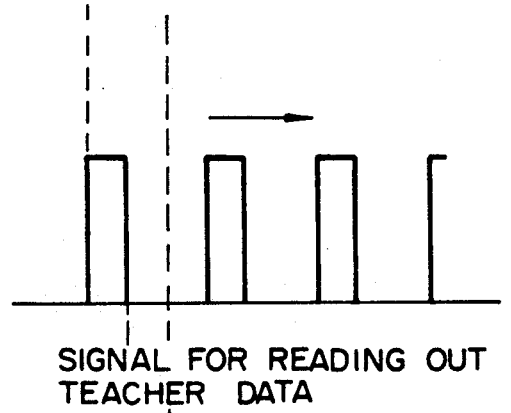
SIGNAL FOR READING OUT
TEACHER DATA
FIG. 25C
LEARNING
FIG. 25D
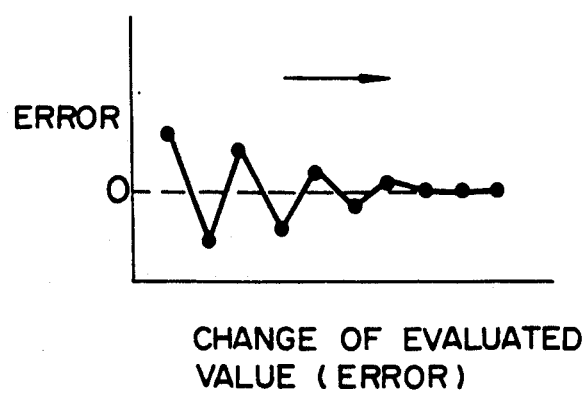
CHANGE OF EVALUATED
VALUE (ERROR)

NEURAL NETWORK WITH LEARNING FUNCTION

BACKGROUND OF THE INVENTION

1. Field of the Invention

The present invention realtes to a neural network with learning function, a method of learning therefor, a method of performing integrated processing of a plurality of information such as time-series information, and a neural network system therefor.

2. Description of the Related Art

Conventionally, as disclosed in "Parallel Distributed Processing I and II", (1986), there have been a method of learning and storing one-to-one correspondence relationship between data. The conventional method fails to take into full consideration the characteristics of a neural network which is that a desired task can be satisfactorily executed by mixing and processing features of input data different in natural from each other, for example. Therefore, processing such as pattern recognizing, as well as processing of data changing with time such as time series data cannot be fully processed.

Development of a neural network system handling time series data appears to be made considerably lower than that of a static processing system for processing a static signal or image. A multilayer neural network is designed to learn and store input data and mapping relation of the data with corresponding data which is generally encoded. For this reason, there is no room for time as a data element to be incorporated, so that when dynamics such as time series data are an object of processing, a new network configuration is required. The neural network already proposed can of course process time-series data, if data within a given (time) interval can be regarded as a static block of patterns. However, in this method, the time correlation important for the time series data is entirely ignored. Thus, none of the conventional neural network systems has necessarily get a success in processing time series data. Even the processing of audio data in which the time relation is important is grasped only as a problem of storage of mapping of static data. No reference is found in which a neural network system is designed from the viewpoint of learning and storing of the time correlation which is essential for time series data.

SUMMARY OF THE INVENTION

One of objects of the present invention is to provide an neural network system comprising a neural network for individually processing and storing features of input data different in nature and for performing integrated processing of the features, taking uncertain elements of the environment into consideration.

In order to achieve the object, according to the present invention, there is provided a neural network system capable of performing integrated processing of a plurality of information, which includes a feature extractor group for extracting a plurality of learning feature data from learning data in a learning mode and extracting a plurality of object feature data from object data to be processed in an execution mode, and an information processing unit for learning the features of the learning data, based on the plurality of learning feature data from the feature extractor group and corresponding teacher data in the learning mode, and for determining final learning result data from the plurality of object feature data from the feature extractor group in accordance with the result of learning, including a logic representative of relation between the plurality of object feature data, in the execution mode.

According to the present invention, complicated data and relation therebetween can be related to another data, thereby making it possible to realize mapping between data in a range wider than that of one-to-one correspondence relation in the conventional methods. As a result, visual and audio information, for example, can be simultaneously handled.

In addition, pattern recognizing can be made in higher accuracy than in the prior art.

BRIEF DESCRIPTION OF THE DRAWINGS

FIGS. 9A, 9B and 9C are diagrams showing original data wide-range feature data, and local feature data, respectively;

FIGS. 25A, 25B, 25C and 25D are diagrams for explaining the timing of fetching input data and teacher data, and learning of them in the multi-input type of neural network.

DESCRIPTION OF THE PREFERRED EMBODIMENT

Figure 1:
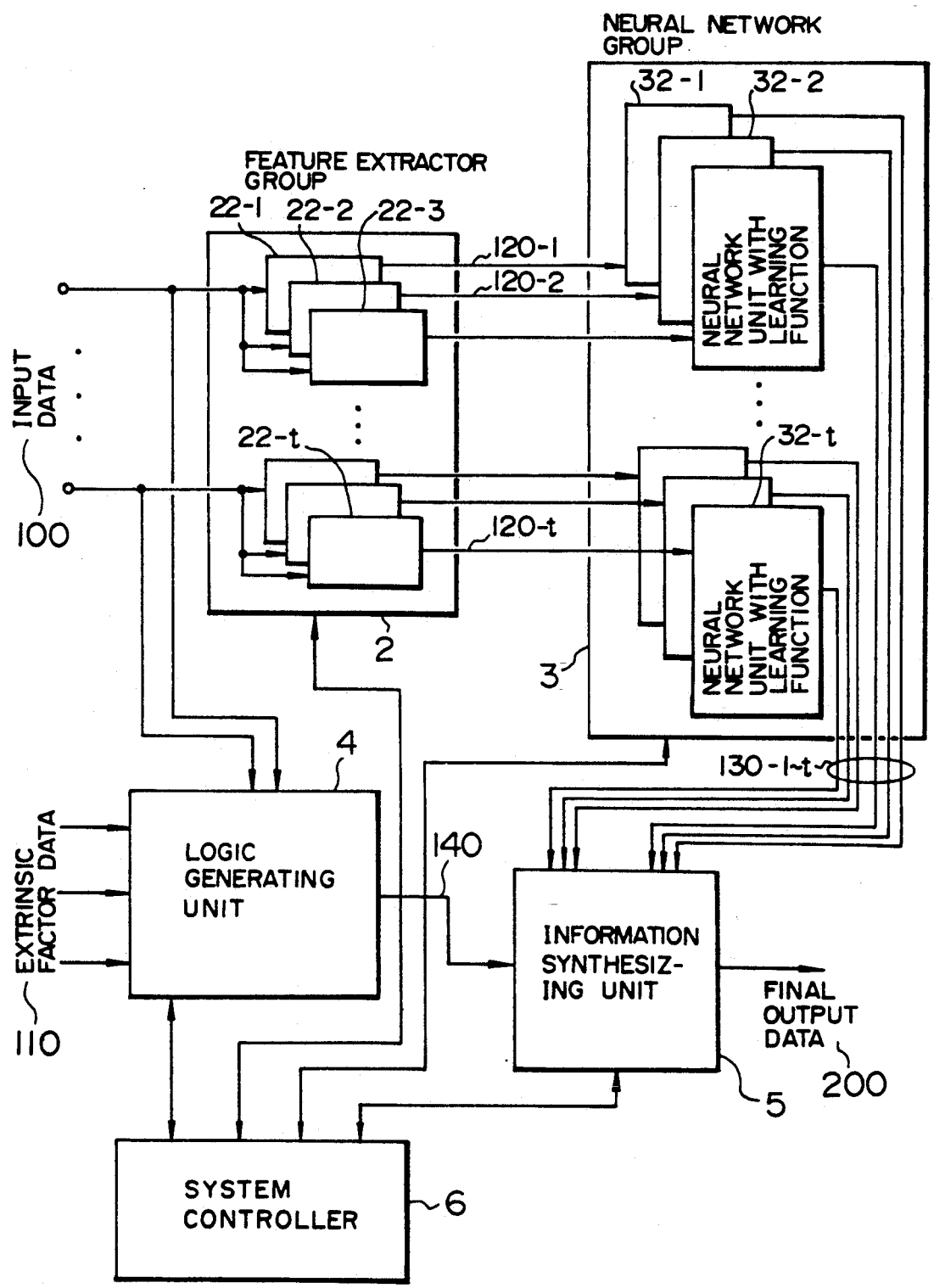
FIG. 1 is a block diagram showing a configuration of a neural network system according to an embodiment of the present invention.

A neural network system according to the present invention will be explained with reference to the accompanying drawings.

First, the concept of the present invention will be described.

In the neural network system for performing integrated processing of various information such as pattern information and audio information different in nature from each other or information having a plurality of features, each definite input data is divided into several parts in advance in accordance with features to be extracted, supplied to a plurality of feature extracting units, and handled as different data, in order to avoid confusion in subsequent processes. Each feature data is learned and stored in parallel in a corresponding neural network with learning function of a neural network group. Data representing uncertain and ambiguous extrinsic factors of the surrounding environment, which are processed in a competitive-cooperative neural network, are supplied to a logic generating unit for generating a relation logic, which unit performs integrated processing of various type of data or feature data, to determine information required for synthesizing feature data, i.e., the relation logic. Finally, the feature data separated and extracted from the input/data are synthesized in an information synthesizing unit by use of the relation logic obtained from the uncertain extrinsic factor data which are processed in the competitive-cooperative neural network, thus finally generating output data.

In order to permit the processing of the data input to the overall network system by neurons, the data is normalized to, for example, a value in a range between 0 and 1, and further is quantized, as required. Required different features such as wide-range features indispensable for processing average behaviour and local features representing detailed fluctuations are extracted from the quantized data in accordance with objects of processing such as time-series data processing and process control, and are output from neurons located at an output of each neural network, which is configured of one or a plurality of neurons in correspondence with the number of input data.

Neurons are connected to each other by synapses whose information transmission efficiency can be changed. Each neuron executes a threshold value logic operation for determining its output in accordance with total weighted inputs. The neural network is of a multilayer type having two or more layers, including input and output layers, a number of neurons determined in accordance with required scale are connected to each other, and the output data from a corresponding feature extracting unit is supplied to its input and output layers. The neural network learns past events and distributively stores, correspondence relationship between input and output, i.e., mapping in neurons by adjusting values of synapse connections.

A logic generating unit as a statiscal means determines, as the relation logic, influence to the final output data due to uncertain and ambiguous data from the competitive-cooperative neural network, e.g., a rule relating to weighting of the feature data extracted by the feature extracting unit, depending on the casual relationship for one or more unknown immeasurable factors.

In the information synthesizing unit, predicted data from the neural networks are synthesized in accordance with the relation logic to generate final predicted data.

Now, a configuration of a neural network system according to a first embodiment of the present invention will be explained, with reference to FIG. 1.

A neural network system for performing integrated processing of various types of feature data different in nature from each other comprises a feature extractor group 2 for handling definite input data as different data and extracting features from the input data, in order to avoid confusion in subsequent processes, a neural network group 3 with learning function for learning and storing data representing features in parallel, a logic generating unit 4 for determining a relation logic 140 required for synthesizing feature data, from uncertain and ambiguous data 110 which are processed at the competitive-cooperative neural network, and an information synthesizing unit 5 with learning function for synthesizing the feature data separated and extracted to output final result data by use of the relation logic determined by the logic 4.

Figure 2:
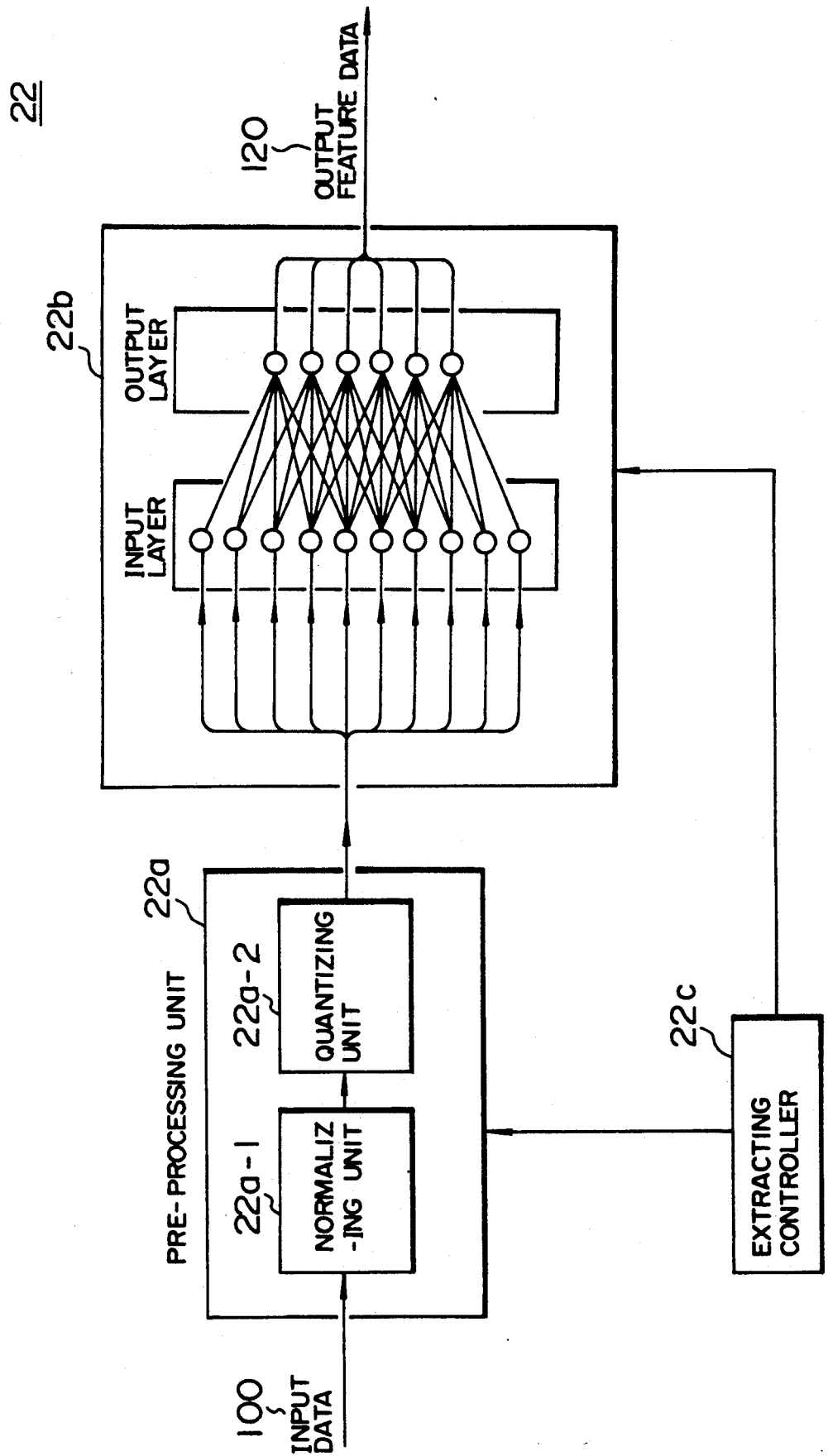
FIG. 2 is a block diagram showing a configuration of a feature extractor of the embodiment.

The feature extractor group 2 includes a plurality of feature extracting units 22 (22-1, ..., 22t) each provided for a feature to be extracted. Each extracting unit in turns includes a pre-processing unit 22a, an extractor 22b and an extracting controller 22c (FIG. 2). A normalizing unit 22a-1 of the pre-processing unit 22a is supplied with data 100 and normalizes the data to a predetermined range of value to permit processing by neurons. The quantizing unit 22a-2 quantizes an output from the unit 22a-1, as required. Each extractor 22b outputs feature data 120 representing a feature, e.g., a wide-range feature indispensable for processing average behaviour or a local feature indicating a fine fluctuation, in accordance with an object of processing such as time-series data processing and process control.

The extractors 22b can realize the process of separating the pre-processed data into different features, by means of filters of different sizes or a multilayer neural network with two or more layers in which a coefficient of each synapse connection is fixed.

Figure 4:
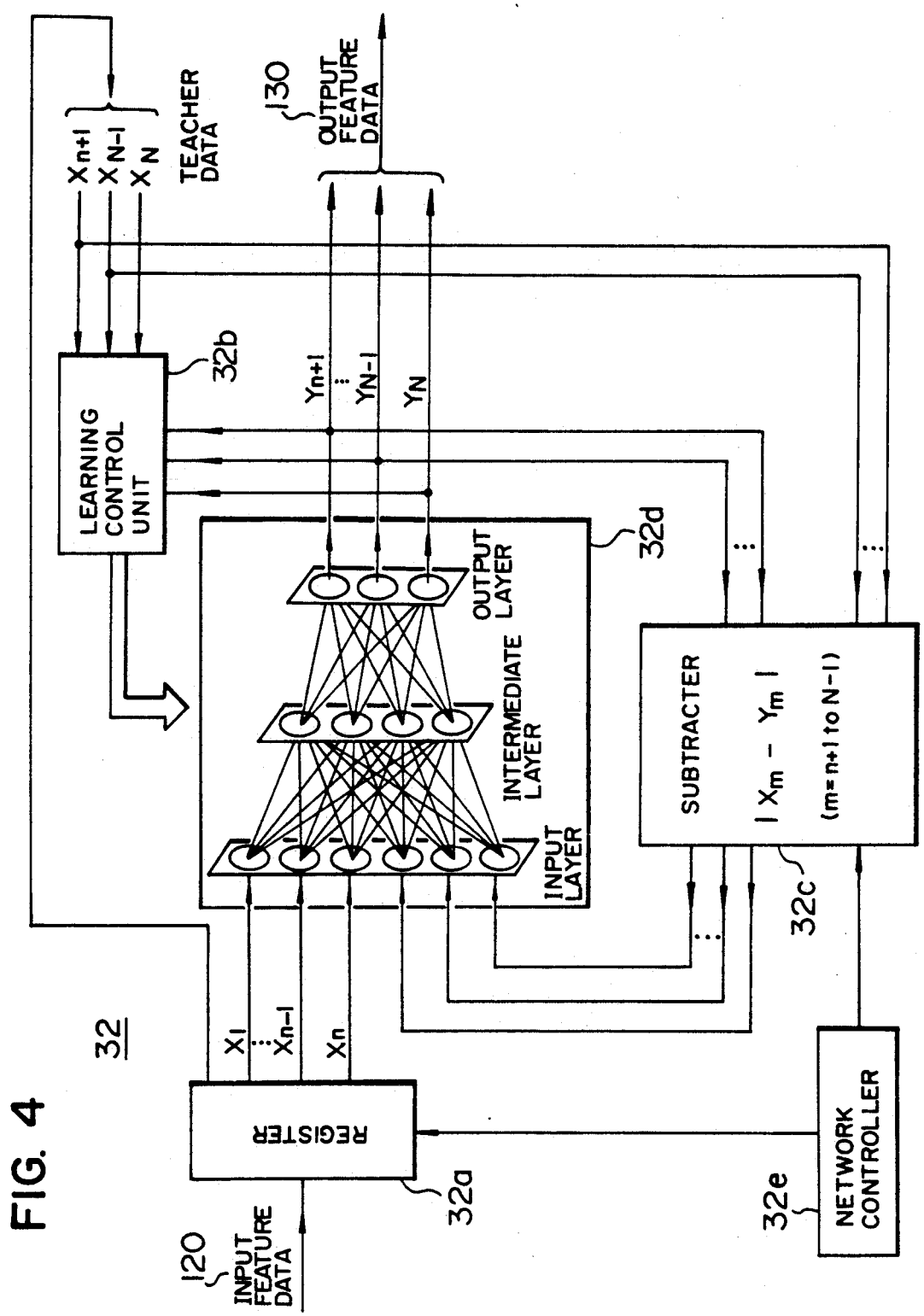
FIG. 4 is a block diagram showing a configuration of a neural network unit of the embodiment.

The neural network group 3 includes a plurality of neural network units 32 with learning function, each provided for feature data. Each neural network unit 32, as shown in FIG. 4, has a learning control unit 32b, a subtracter 32c, a network controller 32e and a network 32d. Neurons between layers of the network 32d of each network unit 32 are connected with each other through synapses whose information transmission efficiency can be changed. Each neuron executes a threshold value logic operation in which its output is determined in accordance with values of total weighted inputs. Each network 32d is of a mutlilayer type with two or more layers, including input and output layers, in which network a number of neurons determined according to a required scale are connected to each other. The feature data from a corresponding extractor of the feature extractor group 2 is supplied to the input and output layers of each network 32d, and a correspondence relationship between its input and output, i.e., a mapping is distributively stored into synapse connections by appropriately adjusting values of synapse connections through learning based on past events.

The neural network unit 32 with learning function can perform processing for identifying, recognizing or predicting time series data including a time factor, as well as processing for identification and recognition of a pattern of a signal or an image. In that case, the time correlation of successive data is learned.

In a learning mode, the input layer of the neural network 32d is supplied with time series feature data as continuous learning data obtained from a corresponding feature extracting unit 32, and the learning control unit 32b with time series teacher feature data after a time period required for a subsequent identifying, recognizing or predicting process. Further, in order to assure that data output from the output layer of the network 32d has time correlation with the learning feature data, the output data is fed back to the input layer as data at a corresponding time. Specifically, the teacher data Zm and the outputted data Ym are supplied to the subtracter 32c for performing a subtracting operation, i.e., to calculate Zm−Ym. After absolute value data of the result of this calculation is calculated, it is supplied and fed back to the neural network 32d.

In the recognizing process after completion of learning, i.e., in an execution mode, the input layer receiving the feed-back data is always supplied with 0 or predetermined value data from the subtracter 32c under the control of the controller 32e.

As a result, in the recognizing, identifying or predicting process of data other than time series data, no feed-back loop is formed but predetermined value data is supplied unless otherwise required.

It should be noted that absolute value data is calculated in this embodiment by the subtracter 32c since each input of each neuron of the neural network is expected to be positive.

The logic generating unit 4 determines, by statistical means, a relation logic representing influence to the final processing result data 200 due to uncertain and ambiguous data, which are generated from the competitive-cooperative neural network, on the basis of the casual relationship between one or more immeasurable and unknown factors and the final processing result data, e.g., a rule relating to weighting of the feature data extracted from the feature extractor group 2.

Figure 5:
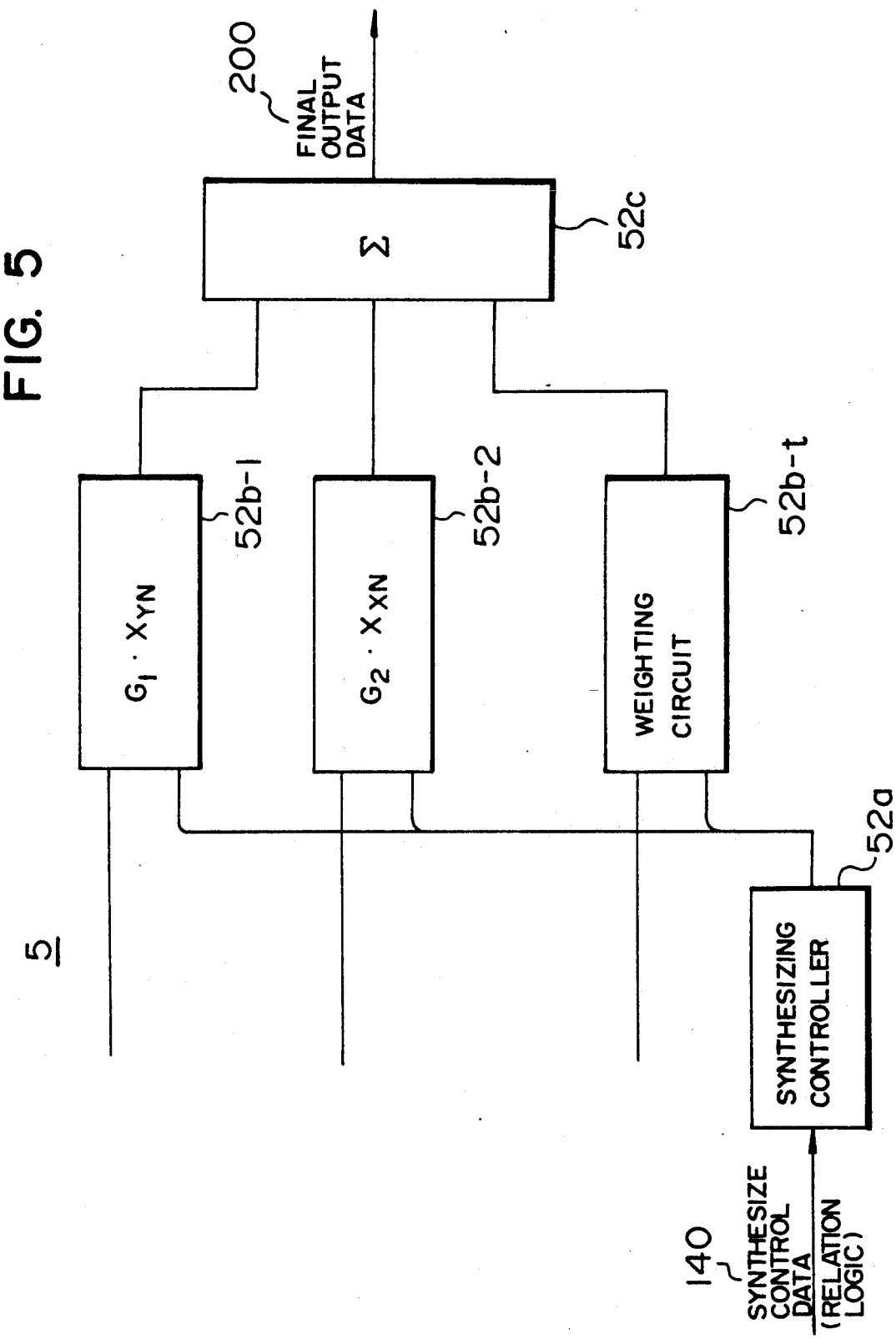
FIG. 5 is a block diagram showing a configuration of an information synthesizing unit of the embodiment.

As shown in FIG. 5, the information synthesizing unit 5 includes a synthesizing controller 52a for receiving synthesize control data determined by the unit 4 as the relation logic, weighting circuits provided for respective outputs from the neural network group 3, and an adder 52c. The controller 52a generates weighting coefficients corresponding to the respective weighting circuits 52b as outputs in accordance with the relation logic. Each weighting circuit 52b multiplies the weight coefficient by the result data from the network group 3, and supplied the result of operation to the adder 52c. The adder 52c adds the outputs from all the weighting circuits 52b, and generates a result of the operation as final result data 200.

The system controller 6 controls the feature extractor group 2, the neural network group 3, the logic generating unit 4 and the information synthesizing unit 5.

An operation of the first embodiment of the neural network system according to the present invention will be explained below. Pattern identifying or recognizing processing will also become apparent from the description that follows.

Before entering a detailed explanation of each unit, the flow of data in the whole system will be described roughly with reference to FIG. 1.

It is assumed that time series data given as information having different features is represented by $X_N$ ($N=1, 2, 3, \ldots$). The first stage of data processing is how features of the data $X_N$ are grasped. In other words, the problem is whether the data $X_N$ should be used as it are, as an input to the neural network group 3 or it should be used after being subjected to some processing. Although this of course depends on a processing object, consider two types of processing data. As general characteristics of a neural network, a neuron uses a saturation function, e.g., a sigmoid function as an output function, and therefore original data tends to be smoothed, that is to say, it has the effect of noise reduction. As described below, however, in a case where fluctuation itself is important as in stock price, the fluctuation is undesirably eliminated by the noise-reducing effect of the saturation function. In view of this, the fluctuation itself needs to be separated and determined as another data by subjecting the data $X_N$ to a differential operation. Assume that the data thus separated is named Y data and X data. Considering a model for determining influence due to extrinsic factors by synergetic statistical means, these X and Y data must be synthesized to generate final prediction data.

The feature extractor group 2 can be supplied with a plurality of data 100. The supplied data may be either plural or single in number. At least one feature extracting unit 22 is provided for each input data. At least one feature is extracted from each input data. In the case of single input data as in the present embodiment, data representing a plurality of features are extracted from the input data by a plurality of extracting units 22.

In the feature extractor group 2, as shown in FIG. 1, given time series data 100 is divided into $X_{YN}$ data 120-1 representing a wide-range feature and $X_{XN}$ data 120-2 representing a local feature, like $X_N = \alpha X_{YN} + (1-\alpha) X_{XN}$, where $\alpha$ designates a positive parameter from 0 to 1 and represents a data mixing ratio of "$X_{YN}$" and "$X_{XN}$".

In this way, the time series data named "$X_{YN}$", "$X_{YN}$" are given from the data $X_N$ ($N=1, 2, 3, \ldots$).

In order to supply given data to the neural network group 3, it is necessary to normalize the data to be in a range from 0 and 1 by the pre-processing unit 22a, as shown in FIG. 2. In this embodiment, in the pre-processing unit 22a, after each data is subjected to linear conversion so as to make an average of them be zero, and further subjected to sigmoid conversion, normalization by the normalizing unit 22a-1 is performed. Furthermore, the normalized data is quantized by the quantizing unit 22a-2 under the control of the controller 22c, as required.

Figure 11:
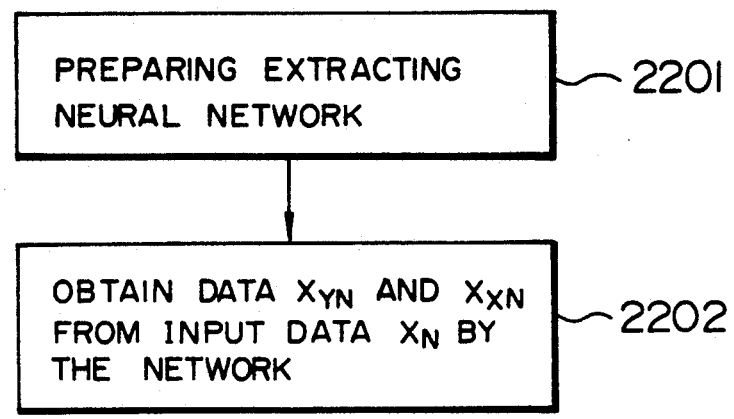
FIG. 11 is a diagram for explaining an operation of the feature extractor unit of the embodiment.

Referring to FIG. 11, a network extractor 22b is prepared for extracting features at step 2201, and the time series data $X_N$ is divided at step 2202 in accordance with the equations shown below.

$$Y_{YN} = X_N \tag{1}$$

$$X_{XN} = \left( X_n + \sum_{j=n}^{N} \nabla X_j \right) \tag{2}$$

In the above equation (1), the original time series data "$X_N$" is used as it is as the wide range feature data, because it is possible to obtain data free of unnecessary information such as noises by utilizing the characteristics of the saturation function of each neuron. In spite of this, data $<X_N>$ explicitly subjected to an averaging operation may be used as an alternative. The data "$X_N$"

desirably represents a local feature of the data "$X_N$", i.e., a fluctuation component, and therefore in this example, it is expressed by use of data $\nabla X_j$ which provides a difference obtained by subtracting reference data "$X_n$" at a given reference time from the data "$X_N$". In this way, the feature data "$X_{YN}$" and "$X_{XN}$" can be generated by a simple network with fixed synapse connection coefficients, as shown in FIG. 2, which coefficient is determined at step 2201. The pre-processed data is propagated from the input layer to the output layer. The neurons in the input and output layers are connected through synapse connections, each of which may have a positive or negative predetermined value, depending on the object of particular data processing, i.e., the features to be extracted. The features "$X_{YN}$" and "$X_{XN}$" thus extracted are taken out of the extractor 22b.

The inclination of the sigmoid function for each neuron is set approximately to be zero for the least value and approximately to be 1 for the largest value. Converting of real data into binary data would appear to be more appropriate for an input to each neuron. However, a serious difference with the result obtained by use of binary data has not yet been found as long as linear and sigmoid conversions are effected successfully. In addition, the use of binary data would remarkably increase the number of neurons and connections. It should be noted that the method mentioned above is used in the simulation test shown below from the above reasons.

In order to generate the fluctuation component from the time series data "$X_N$" as another data "$X_{XN}$", extraction may be effected by subjecting the data "$X_N$" to a differential operation, for example. Further, when a higher-order fluctuation is required, a higher differentiation may be performed. As another method, similar processing is possible by preparing Gaussion filters having different widths.

Now, an operation of the neural network group 3 will be explained with reference to FIG. 4.

Input data $X_{Y1}$ to $X_{Yn}$ or $X_{X1}$ to $X_{Xn}$ are sequentially supplied to a shift register 32a, and further supplied to the input layer of the network 32d under the control of the controller 32e. The network 32d generates data $Y_{n+1}$ to $Y_N$ as output feature data.

Figure 6:
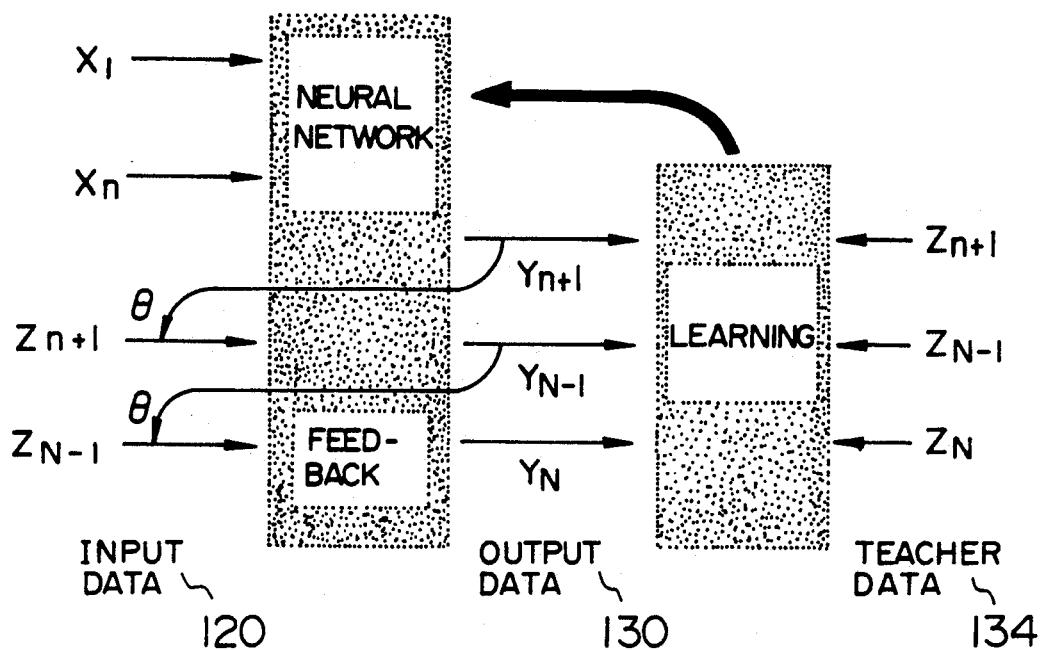
FIGS. 6 and 7 are diagrams showing connections in the neural network unit in learning and execution modes.
Figure 7:
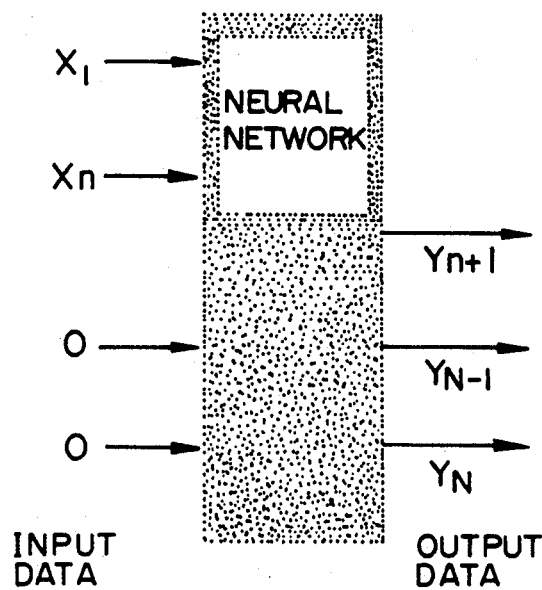

The input-output relationship of the neural network unit 32 in the learning and execution modes is shown in a modeling manner in FIGS. 6 and 7. This input-output relationship of the neural network unit 32 is commonly used for both the wide-range feature data "$X_{YN}$" and the local feature data "$X_{XN}$", although the connection coefficients between neurons for them are different from each other. The network units 32 for the two features are named Y and X storages, respectively. One of the features of the network unit 32 according to the present invention lies in that, as shown in the figure, the output data of the network 32d is fed back to the input layer thereof through a subtracter 32c in the learning mode of the time series data. This feedback loop permits each of the output data $Y_{n+1}$ to $Y_N$ to be related to input data before one or several time units.

More specifically, absolute value data of the difference between the output data $Y_{n+1}$, i.e., the prediction data at the first prediction time and a corresponding teacher data $X_{n+1}$ is fed back to the input layer of the network 32d. As a result, the prediction data at the second prediction time can reflect the time dependency of the prediction data at the first prediction time. Even though the third prediction data is dependent on the first prediction data, the feeback loop makes it possible for the influence of the first prediction data to be reflected in the third prediction data through the second prediction data.

The problem of predicting the data group $X_{n+1}$ to $X_N$ well into the future from the current data group $X_1$ to $X_n$ will be studied. As shown in FIG. 6, all the data up to the time point n can be used in the learning process. In this way, the data for normal control processing such as condition inference can be handled in a similar fashion. From the viewpoint of the conventional simple neural network, the learning process is grasped as storing of mapping of relation between the input data $X_1$ to $X_n$ and the teacher data $X_{n+1}$ to $X_N$, for example. In the conventional method, the influence to the prediction data due to data before one or several time units are entirely ignored in the subsequent output data $X_{n+2}$ to $X_N$ other than the first prediction output data $X_{n+1}$. This will make the characteristics of time series data completely meaningless as in a conventional mapping between patterns. The above description will be readily understood from a fact that time series data can be generally written as $$X_j = F(X_{j-1}, X_{j-2}, \ldots), j=1, 2, 3, \quad (3)$$

by use of a function F. In other words, the time series data processing is not storing of mapping between patterns but associating of corelation between data, i.e., determining of the function F.

In the execution mode, however, although the prediction after one unit time into the future is of course possible, presence of the feedback loop makes it impossible in principle to simultaneosuly determine plural prediction data after a long time into the future, which constitutes one of the problems to be solved in the present invention. Although presence of the feedback loop poses no problem as all data are usable in the learning mode, an arrangement is made such that the feedback loop can be cut off in the recognizing or predicting process, as shown in FIG. 7. Specifically, the subtracter 32c supplies data "0", i.e., data indicating absence of an error as a feedback data to the input of the network 32d under the control of the controller 32c.

As far as preceding data has no influence to subsequent data, the subtracter 32c supplies the data "0" to the network 32d even in the learning process.

More specific explanation will be made below.

In order to process time series data, the data expressed by the equations below is used as input data corresponding to the output data.

$$|X_j - Y_j|, j = n+1, n+2, \ldots, N$$

$$|\nabla X_j - \nabla Y_j|, j = n+1, n+2, \ldots, N \quad (4)$$

Calculation of absolute value data is because an input to each neuron is limited to a positive value in this embodiment. When the learning process is completed, the equations $X_j = Y_j$ (j=n+1, n+2, ..., N) should have been realized, and therefore the feedback loop is substantially removed in the recognizing process. The time correlation of time series data is distributively stored in each connection coefficient between neurons in the learning process, and therefore the present invention is essentially different from the simple mapping between patterns in the conventional method. It should be noted that even when the input becomes zero, the neurons always remain active since 0.5 is output on the basis of the output characteristics of the neurons.

In the learning process, the learning control unit 32b causes the network 32 to learn past data changing a coefficient of each of the synapse connections between neurons in the network 32d in accordance with the teacher data $X_{n+1}$ to $X_N$ and the output data $Y_{n+1}$ to $Y_N$ from the network 32d.

The method of introducing the time correlation will be made possible not only by the method described above but also by a method, in which data $X_j$ and $\nabla X_j$, are fed back in the initial stage of the learning process and thereafter the fed back data is forcibly kept at zero, in place of the equation (4).

Though the features of the input-output relationship of a neural network with the learning function is described, it is assumed that the neural network is of a multilayer type (three-layer in the case discussed below).

Now, the learning process will be described. In a neural network with the learning function, the back propagation method is a representative learning algorithm widely used in the pattern recognition, etc. In the multilayer neural network 32d, as shown in FIG. 4, the input data is propagated from the input layer through an intermediate layer toward the output layer. The output layer is supplied with teacher data. Since no connection coefficient is given in advance, only a meaningless output is obtained. Each connection coefficient is gradually and repeatedly changed in the learning process on the basis of an error between the output and teacher data until the error is substantially eliminated. The back propagation method represents an algorithm of this concept but is not strictly constituted in arithmetic meaning. For this reason, important matters relating to learning ability such as learning speed, learning procedure, and learning capacity are merely accumulated as knowhow. This method, however, has unexpectedly high ability, as will be seen from the fact that various applications have been announced, in spite of an intuitive configuration lacking an arithmetic substantiation.

Figure 3A:
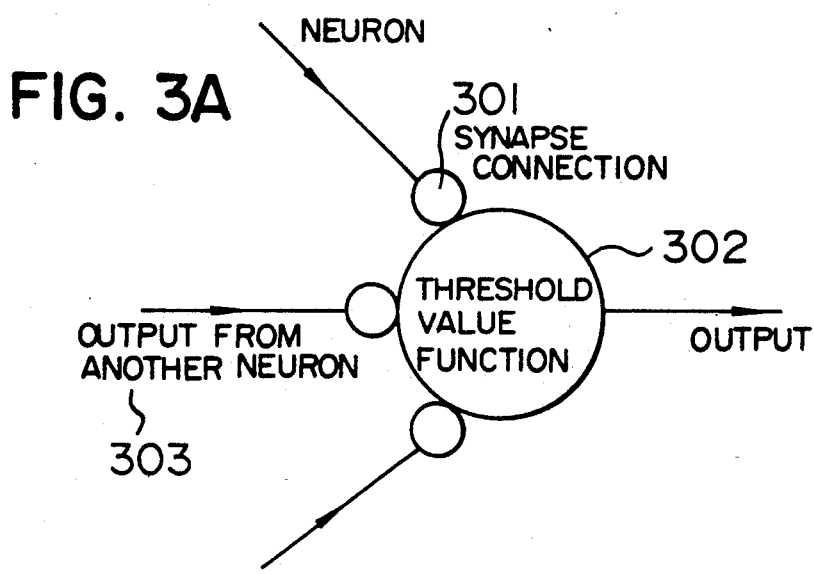
FIGS. 3A to 3C are diagrams showing a neuron structure and threshold value functions.
Figure 3B:
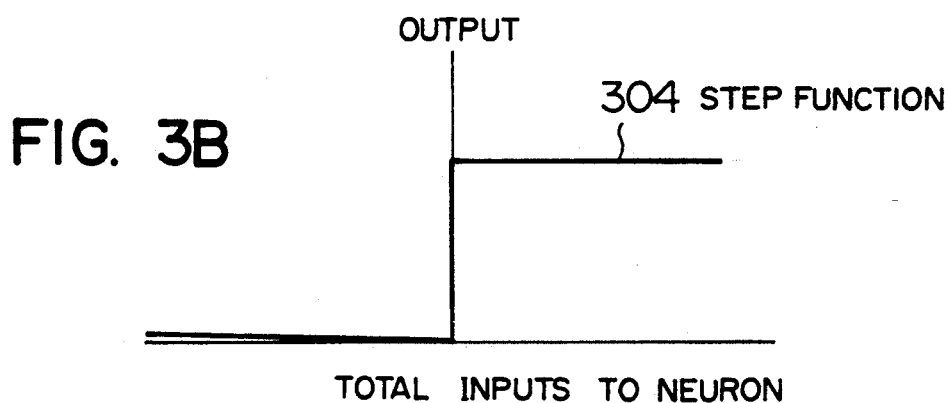
Figure 3C:
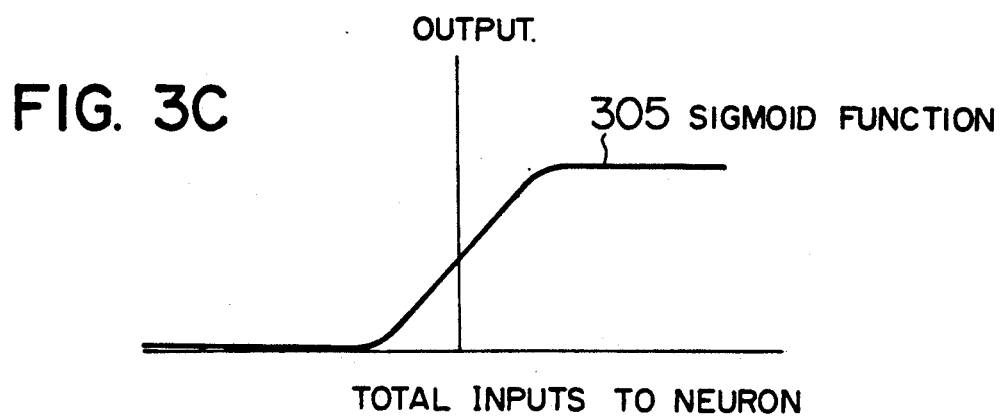

A neural circuit model shown in FIG. 3A represents a neuron of a multilayer neural network, which is often used for pattern recognizing processing or the like. The state of a i-th neuron in a l-th layer as counted from the input layer is assumed to be $X_i(l)$ (l=1, 2, ..., L) and written as $$X_i(l) = f\left( \sum_j W_{ij}(l) X_j(l) X_j(l-1) \right) \quad (5)$$

where $W_{ij}(l)$ is a synapse connection 301 between the i-th neuron of the l-th layer and the j-th neuron of the (l-1)th layer, and f is a threshold value function 302 saturating from 0 toward 1. Generally, the sigmoid function shown in FIG. 3C is often assumed to be $f(Z)=1/\{1+\exp(-(Z-\theta)/T)\}$. Nevertheless, the step function shown in FIG. 3B may be also used. T is a parameter equivalent to temperature, and $\theta$ is a threshold value. The layer number L corresponds to the output layer. The summation in the equation (5) may be performed for outputs from all neurons in the (l-1)th layer in a tightly coupled structure or for neurons present in a predetermined range.

Assume that there are P types of storage patterns which are numbered n (1, 2, ..., P). Making P equations (5) simultaneous, a group of equations $$X_i^n(l) = f\left( \sum_j W_{ij}(l) X_j^n(l-1) \right) \quad (6)$$

is obtained. What is most important for the learning process is to store all patterns with the same connection coefficients. The learning process can be readily performed but has no meaning, if different connection coefficients for different patterns are stored. This indicates that providing of some redundancy to each connection coefficient is important and is the reason for employing the tightly coupled structure in many conventional applications.

The learning method employed for the neural network unit 32 of the neural network system according to the present invention is an algorithm called the back propagation, and each connection coefficient is determined in such a manner as to minimize the square error $$E = 0.5 \sum_i (X_i(L) - D_i)^2$$

in the output layer, where $D_i$ is the teacher data corresponding to an object to be stored through learning. In spite of the fact that this method itself fails to assure the minimization, the convergence, i.e., learning is achieved unexpectedly in many cases. The primary reason is probably that there are unexpectely few minimum values even if there are many solutions satisfying the error 0. This, however, is not yet answered definitely. The second reason is that a probability mechanism for avoiding the minimum value solution is incorporated by some method. It can be considered that a learning pattern is given at random but there is any substantial effect. What is most important is based on the random characteristics of the connection coefficients. In most simulation tests, "random numbers" including a mixture of positive and negative numbers are set as initial values of the connection coefficients. This is because only an apparently meaningless solution is obtained when each connection coefficients has the same sign. Further, all the connection coefficients are not necessarily changed in the learning process, but many connection coefficients remain at or near their initial value due to redundancy of them. As a result, in many cases, the learning is performed to avoid a minimum value solution from the random initial values of the connection coefficients without explicity introducing the probability from the external.

Figure 8:
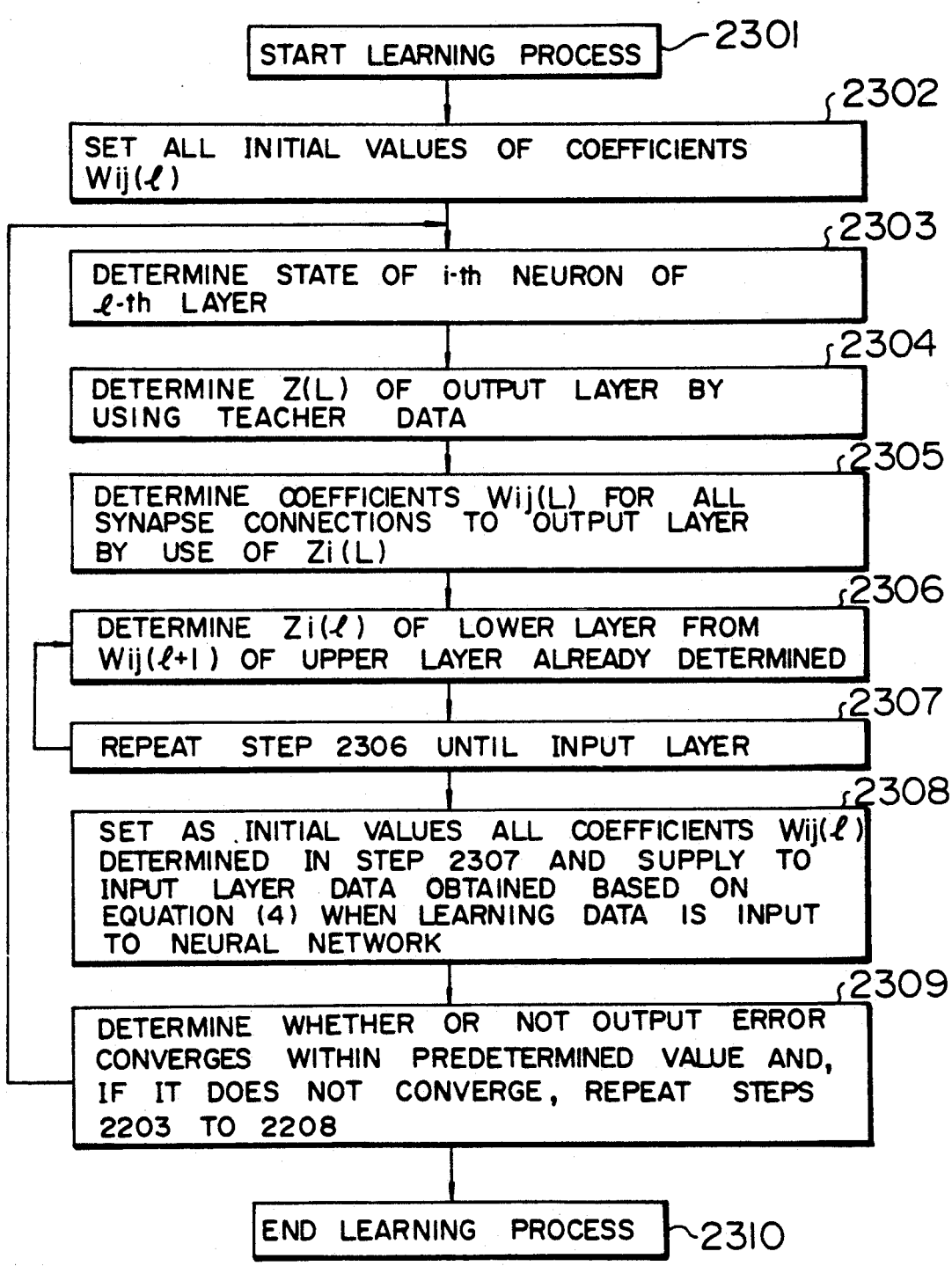
FIG. 8 is a flowchart for explaining learning of a neural network.
Figure 10A:
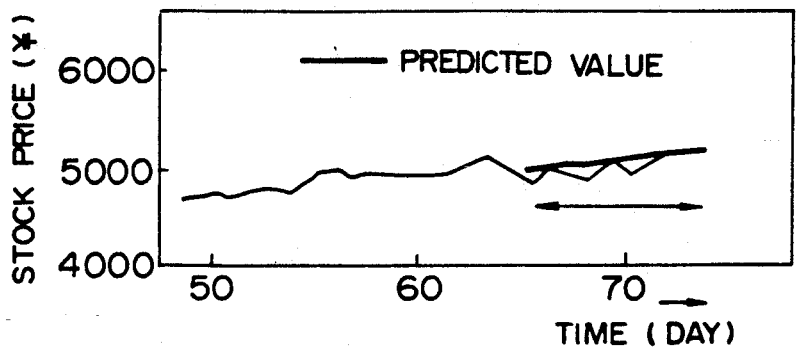
FIGS. 10A to 10D are diagrams showing the result of prediction.
Figure 10B:
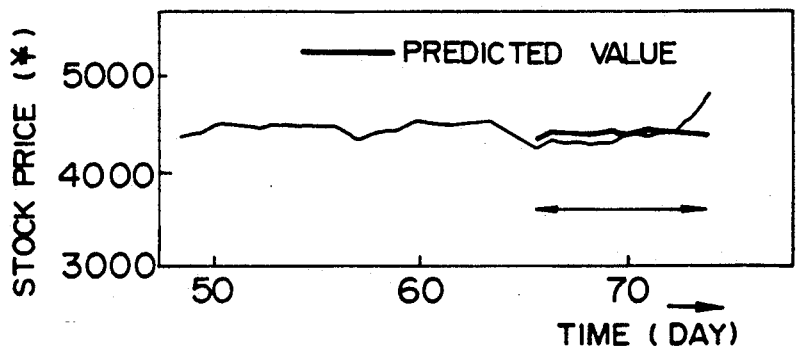
Figure 10C:
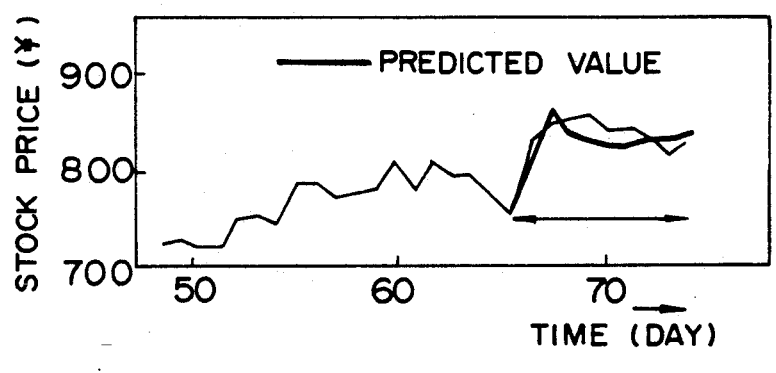
Figure 10D:
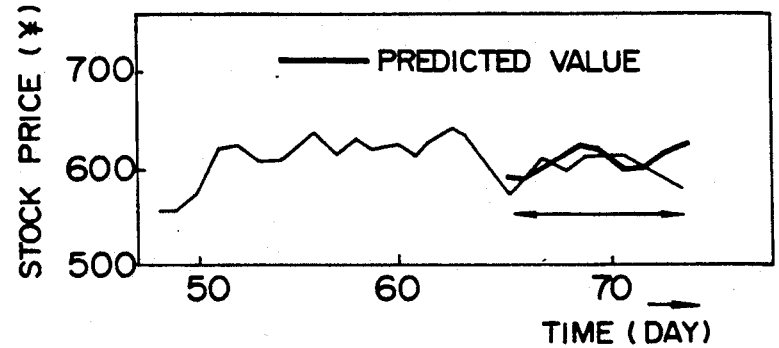

A specific learning method for the neural network unit 32 will be explained below with reference to FIG. 8.

(1) The operation is started (2301).

(2) The initial value of the connection coefficient $W_{ij}(l)$ for each connection is set (2302).

(3) The state $X_i(l)$ of each neuron at each layer is determined for an object of learning (2303).

(4) The value $Z_i(L)$ at the output layer is determined by use of teacher data (2304).

(5) The synapse connection coefficient $W_{ij}(L)$ of each neuron of the output layer is determined by use of the value $Z_i(L)$ (2305).

(6) The value $Z_j(P)$ for a lower layer is determined from $W_{ij}(l+1)$ already determined in the upper layer (2306).

(7) The step (6) is repeated up to the input layer (2307).

(8) The value $W_{ij}(l)$ determined in the above-mentioned manner is set and data obtained from the network output and the teacher data on the basis of the feedback equation (4) is supplied to the input layer of the neural network when the learning data is supplied to the neural network (2308).

(9) Whether the output error has been converged is determined in order to decide whether the iterative operation should be ended, and unless converged, the processes from (3) to (7) are repeated (2309).

(10) The operation is completed once convergence is achieved (2310).

Now, an operation for determining the relation logic, i.e., the value α in the logic generating unit 4 will be explained.

The data learned in the neural network group 3 are data $X_N$ and $\nabla X_j$, and the past time series data before the prediction time is used as the teacher data. These data are of course not independent. However, taking the saturation output function of each neuron into consideration, the data fluctuation component is regarded as independent data. In the stock price data implicitly intended for, this fluctuation component has an important meaning. However, in other cases, the separation made above is not required.

The value α representing the ratio between the wide-range feature data 120-1 and the local feature data 120-2 is a learning parameter in a sense. Factors determining it are not generally present in the data but are considered to be rather extrinsic. Also, all the external factors cannot be always specified and therefore cannot be learning parameters. In spite of this, they are not absolutely indeterminable, but determinable by a method using the statistical characteristics under a condition which could be satisfied in general cases, as described below.

As explained above, since the extrinsic factors for determining the parameter α cannot be always specified, there is needed some different approach. In the embodiment, the assumption that there are a multiplicity of extrinsic factors is positively utilized to direct means (model) for determining the value α by synergetic statistical technique. The extrinsic factors are reflected in the data $X_N$ in any way. Taking into consideration that the value α is inherently a parameter indicative of the ratio between wide-range and local features, the data variation $\nabla X_N/X_N$ is considered to be representation of the total influence of extrinsic factors compressed into one parameter. Since this variation is dependent on time, $\eta = \max\{\nabla X_N X_N\}$ is simply used as a scalar index. After all, the problem is to determine the value α as a function of the index $\eta$. This function is called the membership function in the fuzzy theory.

Expressing an extrinsic factor by a subscript j, and also attaching a subscript to the value α, the value $\alpha_j$ is $0 \leq \alpha_j \leq 1$ from the definition. This indicates that each extrinsic factor individually has the degree of influence to the index $\eta$. It is possible from this definition to make a model, if the value $\alpha_j$ is determined in such a manner as to minimize the energy function $-\alpha_j \eta^2$ for each extrinsic factor, where $\eta^2$ indicates the distributive magnitude of the data fluctuation. When the data fluctuation is small, $\alpha_j = 1$, while $\alpha_j = 0$ in the other case. Specifically, when the average behaviour with the small data fluctuation is important, the data "$X_{XN}$" is used, whereas the data "$X_{YN}$" representing the fluctuation component is used when the data fluctuation is important. Generally, an intermediate value is taken.

Further, in a case that a given factor i and another factor j fluctuate in competition or cooperation with each other, when all the external factors are weighted and added to each other, the energy E can be assumed as follows:

$$E = -\int \sum_{ij} k_{ij}(\eta^2 \alpha_i)(\eta^2 \alpha_j) \Pi_k d\alpha_i \qquad (7)$$

where the positive constant $k_{ij}$ designates a weight. Considering that this is the total energy, the parameter $$<\alpha> = \sum_j <\alpha_j>/\text{(the number of factors)}$$

averaged by use of the probability distribution $\exp(-E)$ can be determined as shown below:

$$<\alpha_i> \sim \int \alpha_i \exp(-E) d\alpha_i/\exp(-E) \sim 1/\eta^2 \qquad (8)$$

This equation indicates that the parameter $<\alpha_i>$ is substantially inversely proportional to $\eta^2$. This result is generated by the logic generating unit 4.

Now, an operation of the information synthesizing unit will be explained with reference to FIG. 5. The relation logic, i.e., the value α determined by the unit 4 is supplied to a synthesis controller 52a. The controller 52a determines a weighting coefficient G for each weighting circuit 52b to supply it the circuit 52b. Each weighting circuit 52b receives the feature data from a corresponding neural network 32 and multiplies it by the weighting coefficient G. A result of this operation is supplied to an adder 52c. The adder 52c determines a sum of outputs of all the weighting circuits 52b, and generates the sum as final output data, or final prediction data in the case under consideration.

In order to show the effectiveness of the neural network system according to the present invention, long-term prediction of the stock price data will be dealt with as a typical example of the time series data. The reason why the prediction of stock price trend is selected is that the stock price appears to be a field requiring a new engineering approach, since its dynamics is not very definite and also exhibits complicated behaviour due to many unspecified extrinsic factors, unlike the conventional process system. Therefore, what is to be solved is to predict a long-term data group $X_{n+1} \sim X_N$ (N=20) from a given data group $X_l \sim X_n$ (n=10).

As shown in FIGS. 9A to 9C, in the feature extractor group 2 the given time series data $X_N$ is decomposed into "$X_{YN}$" data representing a wide-range feature and "$X_{XN}$" data indicating a local feature, as expressed by $X_N = \alpha X_{YN} + (1-\alpha) X_{XN}$.

The input layer of the neural network includes 20 neurons, the intermediate layer 40 neurons, and the output layer 10 neurons. All the neurons of the input layer are used in the learning process, while 10 neurons are used in the prediction process since the feed back loop is not used. The stock price data is daily one and the affix of each data attached thereto indicates the data. However, it has no substantial meaning and will be called a "unit" in this example. The data of 64 units are used for the learning process. Since they are used for every two units in the learning process, data of 22 unit are used as teacher data. It should be noted that even when teacher data of 10 units are selected at random from among all the data, substantially the same conclusion of learning can be obtained. Each teacher data has been learned 100,000 times by the back propagation method for each of the $X_{XN}$ and $X_{YN}$ data (the learning coefficient is 0.5 the inertial term is not considered). The output error is about $10^{-2} \sim 10^{-3}$.

It was also previously determined that the ratio $\alpha$ between wide-range and local features is substantially inversely proportional to $\eta^2$. When the most appropriate ratio $\alpha$ is plotted for all the data used in the learning process, i.e., learning data, it is seen that the above-mentioned relationship is satisfied and its proportionality constant is 23. Using this relationship, the ratio $\alpha$ can be determined from the past data fluctuation components in the case of predicting process, i.e., in the execution mode, thereby making it possible to determine the prediction data $\alpha X_{YN} + (1-\alpha) X_{XN}$.

Results of prediction of movement of the stock price are shown in FIGS. 10A to 10D. In the figures, the prediction data during a prediction period is represented by a thick line with arrow, and the actual stock price data during the prediction period by a thin line. The actual stock price data during the prediction period is not of course used at all in the learning process. Generally, both the absolute value and movement are satisfactory. However, the prediction data after the about nine units tends to deviate somewhat from the actual data. As of the present, the verification of 20 samples has permitted the prediction of up to 16 samples, representing a "hit" rate of 80%.

Three problems to be considered and overcome in applications of a neural network system to the time series data will now be described.

The first consideration in applications of the neural network system to the time series data, as well as other data is directed to that a nonlinear saturation function like a sigmoid function is used as an output function of each neuron. This saturation function smooths the data with a large fluctuation component, regardless of whether smoothing is necessary or unnecessary, thereby removing the data fluctuation component. In view of this effect, although data with a noise attached thereto may appear to be flexibly subjected to association processing, sufficient care must be paid in applications to general series data which are required to have a meaningful fluctuation component. The most certain method of processing the data is to take out the fluctuation component from the original data in advance and to independently process it. In this embodiment under this consideration, the method is realized by extracting features from the original data.

The second consideration is that there is a subjective difference in concept between static data processing and time series data processing when it is assumed that the neural network system is applied to the time series data processing for the long-term prediction. There is a problem of the static data processing system in the processing in which mapping of relation between patterns is stored, while in the time series data processing, there is a subjective problem in determination of time correlation, i.e., relation between data at a given time point and another data at the next time point. In other words, for the time series data processing it is necessary to determine a dynamic process of a processing object by some means or other. This processing has been realized by a neural network in which a feedback loop for relating each output data to the data before one or several time units is provided.

The third consideration is that there are many and unspecified external factors influencing to the data fluctuation. It is impossible to specify all extrinsic factors except for known specified extrinsic factors, and there are a considerable number of such unknown factors in most cases. For this reason, it is necessary to macroscopically grasp influence due to many and unspecified extrinsic factors, to positively introduce the fact that there are a number of such unknown factors, and thereby to determine the macroscopic influence by synergetic statistical means. A means (model) for this purpose is provided by the present invention. The effectiveness of this statistical means has been confirmed by use of actual data.

As explained above, the basic concept of the neural network system according to the present invention and the detailed processing thereof are described. Further, in order to indicate the effectiveness of the invention, the prediction of movement of stock price has been presented as a typical example of time series data under an indefinite environment.

In the prediction of movement stock price according to an embodiment of the present invention, unlike in the conventional process system, the object has not very explicit dynamics and shows such a complicated behaviour as to presuppose many and unspecified extrinsic factors. The present embodiment provides the neural network system for processing for time series prediction after long time well into the future. Nevertheless, this system is also capable of data processing even against general problems under an immeasurable and uncertain environment. Although the problem dealt with in the present embodiment is that of prediction, the present embodiment apparently is applicable with the same effect to general control problems such as condition inference.

A second embodiment of the neural network unit according to the present invention will now be described.

What is especially important in the learning process is that an output error is not always zero, depending on the initial value, for example, or that there are many cases not actually learned, even in a case that the learning is possible in principle, i.e., where the neural network includes a sufficient number of synapse connections so that all learning patterns are stored, as well as where the neural network simply includes intermediate layers of the same number as learning patterns. Also, the number of connections is desirably not very great due to limitation of the learning time, but an excessively small number of connections would tend to lead to a difficult case of learning. Therefore, a neural network with as few connections as possible in a range of in which learning is possible is in principle desirably configured, in which case many troubles would be encountered in learnably setting initial value. If this trade-off relation is to be improved, it is necessary to propose an algorithm which makes the learning possible regardless of the initial value of the connection coefficient.

Figure 12:
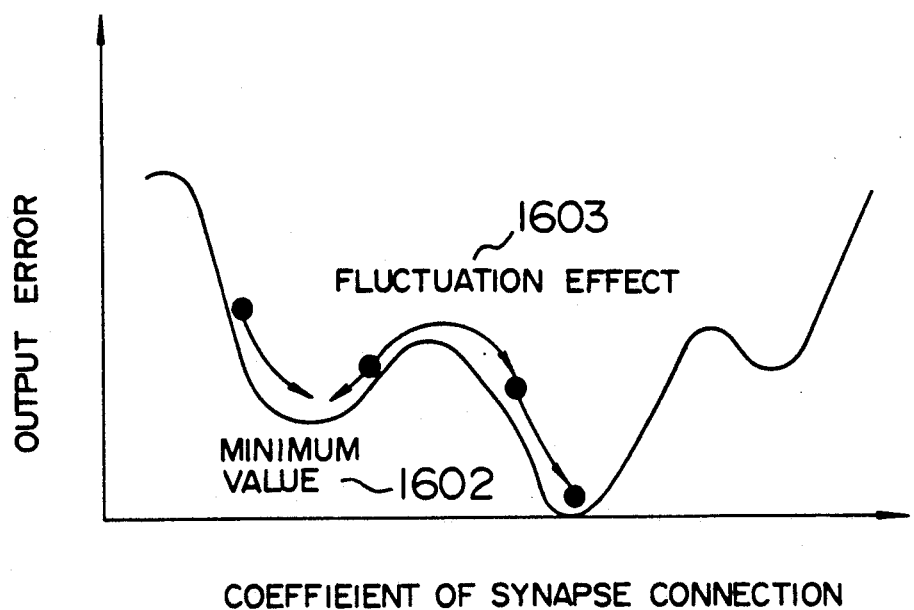
FIG. 12 is a diagram for explaining the learning process of the neural network of the embodiment.

This purpose can be achieved by providing a probabilistic learning algorithm, based on the Langevin probability differential equation, in a manner to assure convergence of an output error which is especially important for the learning in a neural network with the learning function. In the back propagation method, in which an attempt is made to achieve minimization of error by the steepest descent method, an absolute minimization is inherently impossible except for a very few cases. As shown in FIG. 12, an output error generally contains a multiplicity of minimum solutions. In an algorithm having no probabilistic elements therein like the back propagation method, therefore, there is no method of escaping a given minimum solution, once entrapped therein. In view of this, the simulated annealing method has been applied as a learning algorithm as often used to solve optimal combinatorial problems or the like, by which a minimum solution is avoided by use of the fluctuation effect for minimization. The result of simulation shows improved learning performance, compared to the conventional back propagation method.

In order to expand the back propagation method into a probabilistic back propagation method by positive introduction of the probability, the minimization of an output error has been replaced by the maximization of the probability distribution $$\exp(-E/T)$$

where the "temperature" T is a positive constant representing deviation of noise. The maximization (realized state) of probability is equivalent to the Langevin probability differential equation given below as a change with time of the connection coefficient.

$$\Delta W_{ij}(l) = -\eta \partial E/\partial W_{ij}(l) + \xi_{ij}(l) \quad (9)$$

where $\eta$ is a positive constant, and $\xi_{ij}(l)$ an independent additional random noise with deviation T and its average value of zero (white Gaussian distribution being assumed hereinafter). The only difference of the probabilistic back propagation method from the simple back propagation method lies in that a random noise term is added to the right side, which is the very term for making it possible to avoid a minimum solution. This equation, though strict in arithmetic terms as learning for storage of single piece of information, is not established in its very form and is required to be expanded in the case of storing a multiplicity of pieces of information. In the back propagation method, the strict handling is lacking and the learning cycle is merely separated appropriately for each connection coefficient according to the above-described equation for every object.

A specific calculation of the right side of the equation (9) leads to an algorithm described below according to the probabilistic back propagation method.

$$W_{ij}(L) = \eta Z_i(L)X_j(L-1) + W_{ij}(L)^* + \xi_{ij}(L) \quad (10)$$

$$Z_i(L) = (D_i - X_i(L))X_i(L)\{1 - X_i(L)\}$$

$$W_{ij}(l) = \eta Z_i(l)X_j(l-1) + W_{ij}(l)^* + \xi_{ij}(l)$$

$$Z_i(l) = \left(\sum_k W_{ki}(l+1)Z_k(l+1)\right)X_i(l)\{1 - X_i(l)\}$$

$$l = L - 1, \ldots, 2, 1$$

Since the small deviation $\Delta W_{ij}(l)$ of the connection coefficient appearing in the back propagation method is determined as $W_{ij}(l) - W_{ij}(l)^*$, departing from the original definition, it should be noted that the back propagation method does not perform only the minimization of E in a strict sense. If the number of information stored is 1, the application of the equation thereof is brought strictly into the minimization of E, although the meaning thereof is ambiguous when a multiplicity of patterns are stored at the same time. In the case of storing a multiplicity of patterns at random, for example, corresponding patterns are different in the process of determining $W_{ij}(l)$ and $W_{ij}(l)^*$.

Figure 13:
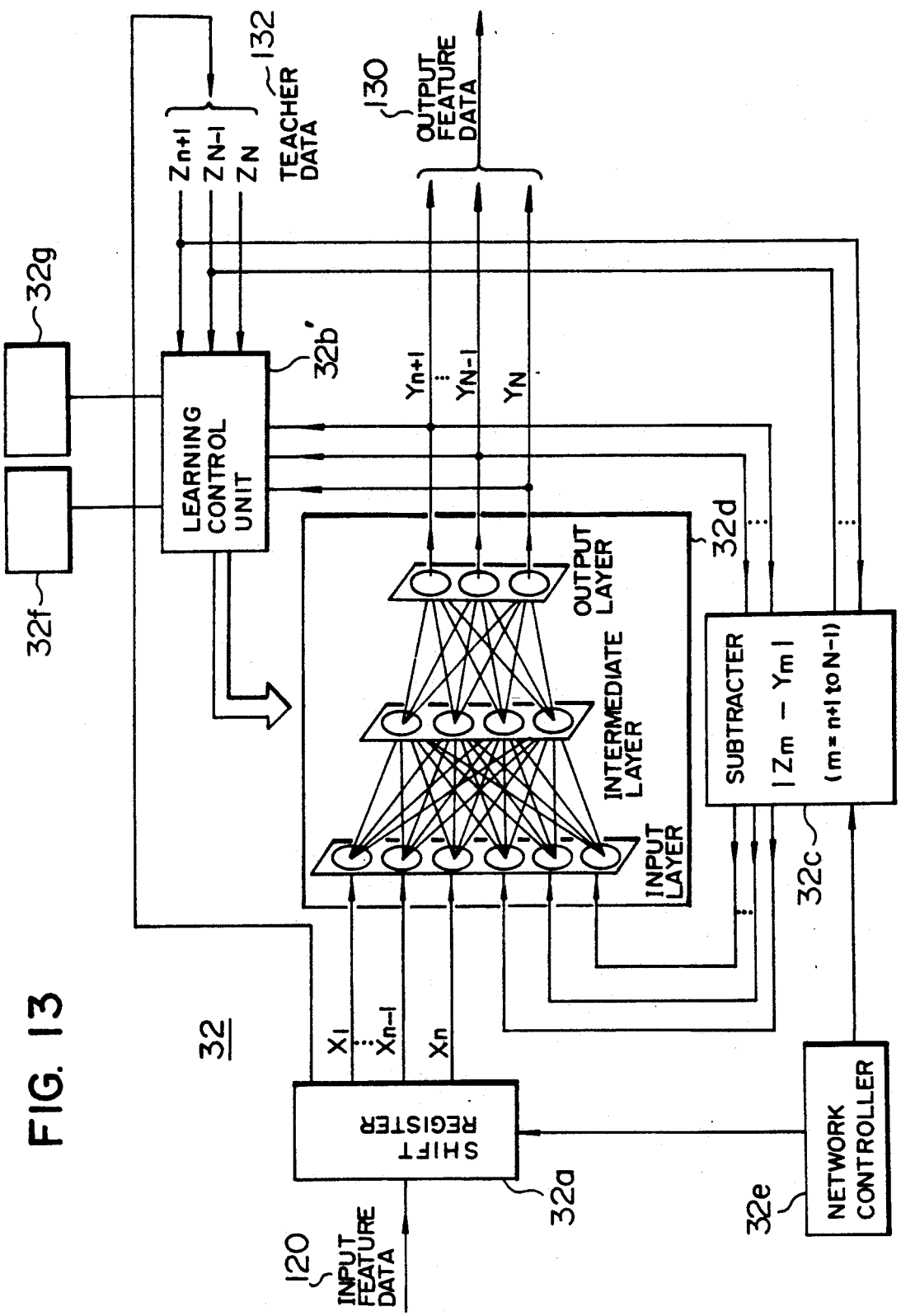
FIG. 13 is a block diagram showing a configuration of another example of the neural network unit.

According to the present embodiment and illustrated in FIG. 13, noise array tables 32f and 32g are added to the configuration shown in FIG. 4. The learning control unit 32b sets predetermined data in these tables in the initial stage of the learning process.

Figure 15:
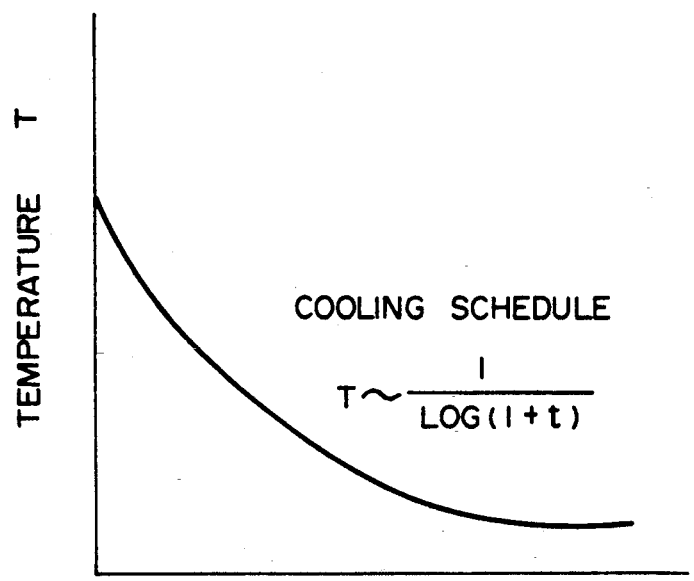
FIG. 15 is a diagram showing a cooling schedule function.

In the converging process for minimizing an output error between output data of the neural network 32d with the learning function and teacher data given as desired values, i.e., in the learning process, where the number of neurons of each intermediate layer located in the middle of a multilayer network is to be reduced to such a degree as required for classification, or to be reduced as far as possible, the minimization of the output error can be assured by utilization of the probability, in which an external noise is added in the change rule of the synapse connection in order to avoid the local minimum as the local solution, and the over learning in which the output error increases in the converging process. The external noise added to the synapse connection is monotonously reduced to zero or the vicinity thereof, depending on the number of learning cycles. An example of the function dependent on the number of learning cycles is shown in FIG. 15 as a cooling schedule.

If all the additional noises in equation (10) are generated independently, a long processing time is required. It is possible to avoid a long learning time by generating a noise equivalent to a product of random data assigned to each synapse connection and noise data determined in dependency on the number of learning cycles. As shown in FIG. 13, the table 32f showing the noise assigned to the synapse connections and the table 32g showing a noise dependent on the number of learning cycles are prepared.

Figure 14A:
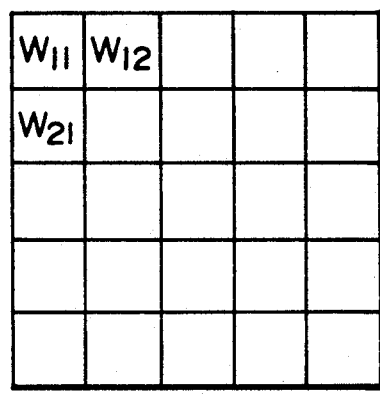
FIGS. 14A and 14B are diagrams showing a noise array table and a table of noise data dependent on the number of learning cycles, respectively.
Figure 14B:
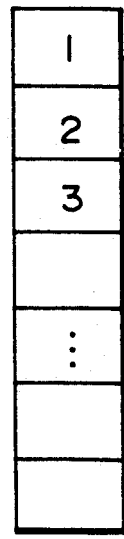

Specific contents of the tables 32f and 32g are shown in FIGS. 14A and 14B respectively. The unit 32b' is adapted to change the coefficient of each synapse connection in accordance with not only the difference between the output of the neural network and the teacher data but also the product of the corresponding noise data in the table 32f and the noise data from the table 32g determined based on the number of learning cycles, i.e., the sum of the difference therebetween and the product thereof to change the coefficient of each synapse connection in the learning process.

Figure 16:
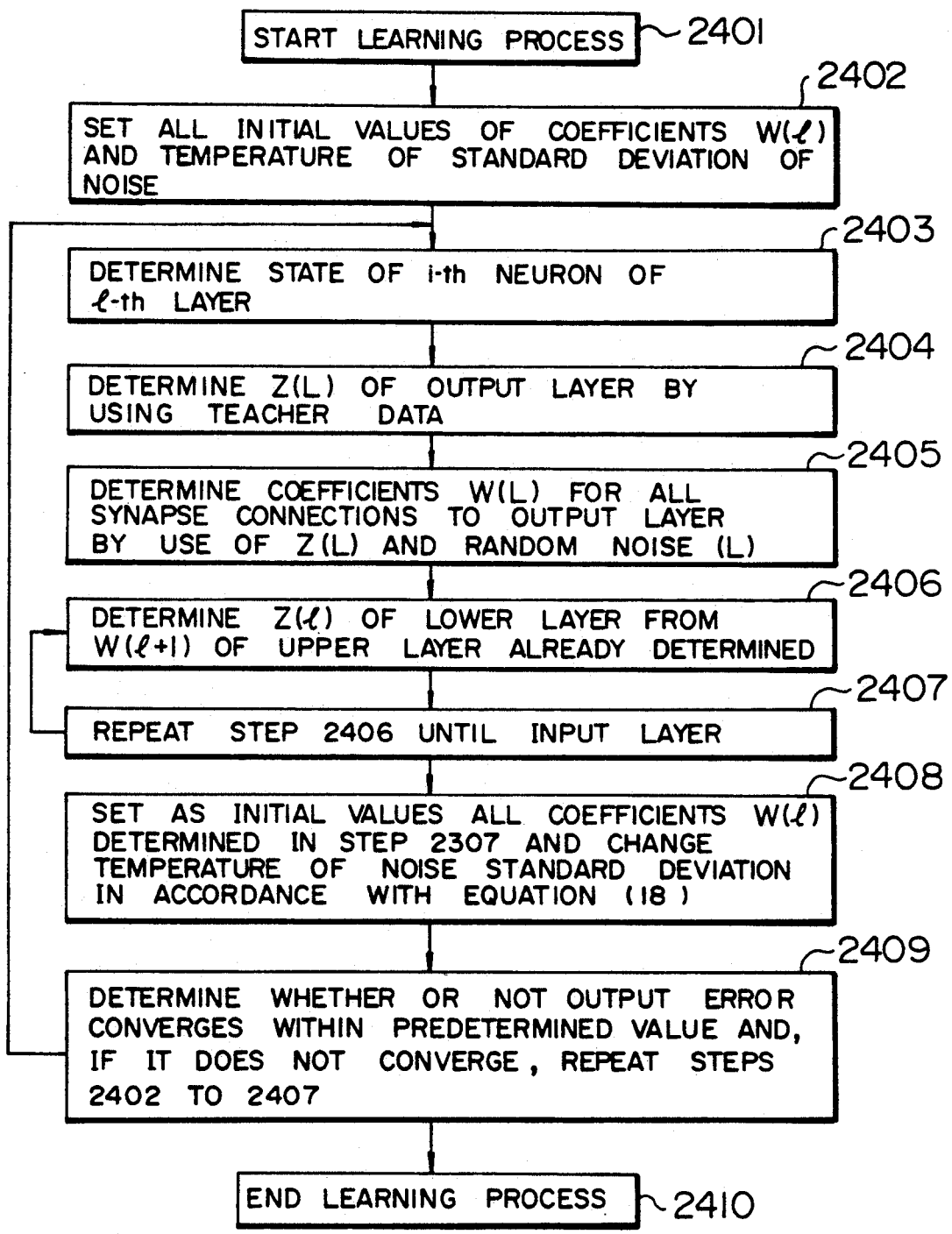
FIG. 16 is a flowchart for explaining the learning process of the neural network using noise data.

An operation of the learning control unit 32b' in the learning process will be explained below with reference to FIG. 16.

(1) The operation is started (2401).

(2) The coefficient $W_{ij}(l)$ and an initial value of the temperature T as the standard deviation of a noise are set. In the process, the unit 32b' also sets data in the tables 32f and 32g (2402).

(3) The state $X_i(l)$ of each neuron of each layer is determined in accordance with the object of learning (2403).

(4) The value $Z_i(L)$ at the output layer is calculated by use of the teacher data (2404).

(5) The connection coefficient $W_{ij}(L)$ of the neuron at the output layer is determined by use of $Z_i(L)$ and the random noise $\xi_{ij}(L)$ (2405).

(6) The value $Z_i(l)$ of a lower layer is determined from the connection coefficient $W_{ij}(l+1)$ already determined for the upper layer and random noise (L).

(7) The process (6) is repeated up to the input layer (2406).

(8) The temperature as the standard deviation of the noise is changed in accordance with $W_{ij}(l)$ determined in the above-mentioned manner as an initial value, based on the equation (18) (2407).

(9) It is decided whether the output error is converged within a predetermined value, and if not, the processes from (3) to (7) are repeated (2408).

(10) Upon convergence, the operation is ended (2409).

The high-speed learning algorithm based on the maximum principle proposed in the Japanese Patent Application No. JP-A-01-97350 invented by the same inventors will be described as another example of the learning method for a neural network. The starting point of the maximum principle is the definition of the cost function J. First, as in the back propagation method, the function $$\sum_n \sum_i (X_i^n(L) - D_i^n)^2$$

is prepared for minimization of the square error in the output layer. This method appears to be identical with the back propagation in form but is different from the back propagation in an important way. In the back propagation method, there is not a term of a sum for the object to be stored, and the minimizing cycle is repeated to forcibly store as many objects as possible after configuration of the algorithm. As a result, various methods are proposed in which the sequence of storage is fixed or set at random or the objects determined separately are added in the end. In the method according to the present embodiment, a term selected from among combinations of connection coefficients is added to the cost function mentioned above, thus employing a new cost function J as described below.

$$J = 0.5 \sum_n \sum_i (X_{in}(L) - D_i^n)^2 + 0.5 \sum_l K(l) \times \quad (11)$$

$$\sum_i \sum_j (W_{ij}(l) - W_{ij}(l)^*)^2$$

where $k(l)$ is a positive constant dependent on the layer number, and $W_{ij}(l)^*$ a fixed value already stored. The second term is for controlling the connections coefficients in a manner not to be displaced greatly from the value already stored, even if it is changed by the learning anew. In the maximum principle, the cost function is also applied to by being incorporated in the equation system, and therefore a new variable $X_s(l)$ is prepared, where s is a function s(l) dependent on the layer and is assigned with the number next to the final neuron in each layer. The equation to which the new variable is subject is assumed to be $$X_s(l) = X_s(l-1) + \sum_n \sum_i (X_i^n(L) - D_i^n)^2/L + k(l) \times \quad (12)$$

-continued $$\sum_i \sum_j (W_{ij}(l) - W_{ij}(l)^*)^2$$

Suppose that the right side is $f_s(l)$, a dynamic equation would be added in place of the cost function, but the handling is facilitated. Now, the Hamiltonian H of the system will be defined.

$$H = \sum_l \left\{ \sum_n \sum_i Z_i^n(l) f_i \left( \sum_j W_{ij}(l) X_j^n(l-1) \right) + Z_s^n(l) f_s(l) \right\} \quad (13)$$

The variable $Z_i^n(l)$ appearing in this equation is an auxiliary variable important for minimization. The equation to which the auxiliary equation is subject is called an adjoint equation which is determined by $Z_i(l-1) = \partial H/\partial X_i^n(l-1)$.

The equation to which the connection coefficient is subject is readily obtained by differentiating the Hamiltonian H for the coefficient $W_{ij}(l)$ and setting it to be zero. Since values at the input and output layers essentially provide the problem of two boundary values from the given configuration, no means is available for analytical solution. Generally, the convergence is calculated by the iterative method.

$$W_{ij}(L) = (1/k(l)) \sum_n Z_i^n(L) X_j^n(L-1) + W_{ij}(L)^* \quad (14)$$

$$Z_i^n(L) = (1 - /LT)(D_i^n - X_i^n(L))X_i^n(L) \cdot \{1 - X_i^n(L)\}$$

$$W_{ij}(l) = (1/k(l)) \sum_n Z_i^n(l) X_j^n(l-1) + W_{ij}(l)^*$$

$$Z_i^n(l) = \left(\frac{1}{T}\right) \left\{ \sum_k \sum_n W_{ki}^n(l+1) \cdot Z_k^n(l+1) \right\} \times$$

$$X_i^n(l)\{1 - X_i^n(l)\}$$

In each layer except for the output layer, since there is a portion where the sum $$\sum_k W_{ki}(l+1) Z_k^n(l+1)$$

relating to the connection coefficient is required to be determined, it is inferred that parallelization is performed not completely but easily. In the layers other than the output layer, there is a portion for calculating the above-mentioned sum relating to the connection coefficient, and therefore parallelization of the portion is impossible in principle. A method for parallelization can be approximately performed by using the connection coefficient before one step which is already determined.

It should be noted that in a large-scaled neural network a portion requiring a long calculation time is not one where the state change of neurons is to be determined but one where the connection coefficient is to be changed. Especially, the calculation is required for all the subscripts i and j. In the change equation of the connection coefficient and the total input $$\sum_j W_{ij}^*(l) X_j^n(l-1),$$

the neuron state is determined by $$\sum_k W_{ki}^*(l+1) Z_k^n(l+1).$$

Therefore, it is expedient to calculate these quantities directly. The coefficient $W_{ij}(l)^*$ at the immediately preceding cycle was used instead of the coefficient $W_{ij}(l)$, because the calculation shown below is effected for the object of learning on the basis of a connection coefficient already learned. The sums of these quantities are expressed as $$\Pi_i^n(l) = \sum_j W_{ij}^*(l) X_j^n(l-1) \tag{15}$$

$$\Theta_i^n(l) = \sum_j W_{kj}^*(l) Z_k^n(l-1) \tag{16}$$

Substituting equation (14) into equation (15), a step equation for the above-described equations, i.e., the learning equation is readily obtained. In terms of program, a double DO loop is replaced by a single DO loop to improve the computation speed. As in the back propagation method, a probabilistic element is introduced to these equations, thereby to obtain the step equation as shown below.

$$\Pi_i^n(l) = \Pi_i^{n*}(l) + \tag{17}$$

$$(1/k(l)) \sum_m \left( Z_i^{m*}(l) \times \sum_j X_j^{m*}(l-1) \right) X_j^n(l-1) + \xi_i^n(l)$$

where $\xi_i(l)$ is an independent random variable with the deviation T and an average value of zero. Once the initial value is set, the calculation of $\Pi_i^n(l)$ is sequentially made possible. The sum $\Pi_i^n(l)$ must be determined from coefficients in the initial iterative stage but it is only as a small proportion of the whole calculations as negligible. The equation (17) corresponds to the so-called first approximation when the state change of neurons is small. After the sum $\Pi_i^n(l)$ is determined in the manner mentioned above, the step equation for the sum $\Theta_i^n(l)$ can be determined from equation (16).

The connection coefficient after learning is completed is determined by demanding establishment of the equation $$\Pi_i^n(l) = \sum_k W_{ik}(l) X_k^n(l-1)$$

for all the objects of storage. This is readily obtained from, for example, the steepest descent method of the square error. In this equation, $\Delta W_{ij}(l)$ is a change component of the connection coefficient and $\lambda$ is a constant used in the convergence calculation and generally is a positive value smaller than one. In this process, the additional noise is also effectively introduced.

This neural network is configured of a given number of layers and neurons arranged in each layer are connected between layers to exhibit a given function. In the learning process of this network, given information or encoded teacher data is stored in the form of connection coefficient between neurons. Further, this learning method is constructed based on a learning algorithm which is suitable for a parallel processing unit and which can freely set a method of storage so as to take a serious view of storage of given information. Furthermore, it makes high-speed learning and storage possible even in a sequential processing unit.

As the cost function, there is set the sum of a function, which expresses the sum of the square errors between values at the output layer obtained from input data and values of the teacher data, for each input combination, the sum of the products of the connection coefficient and the state of each neuron being set as input data to neurons of the upper layer, and a function of the connection coefficients which reflect the selection tendency of the connection coefficient providing a place of storage. The coupling coefficient is determined to minimize this cost function.

The above-mentioned process for determining the connection coefficient which minimizes the cost function is subjected to parallel processing by a processor group corresponding to each input data or a processor group corresponding to a collection of the input data.

In the above-mentioned process for determining the connection coefficient minimizing the cost function and the state of neurons determined thereby, the initial value of the connection coefficient is determined at an appropriate value first of all, followed by sequentially determining the states of neurons of the upper layer on the basis of each input data. As the next step, the connection coefficient continues to be determined progressively from output toward input layer inversely. This process is repeated until convergence is achieved.

The learning algorithm suitable for the above-mentioned parallel operation permits high-speed learning by learning the total input sums to the neurons even in the sequential computer. In the above-mentioned process for learning the total input sums to the neurons, the input sum is separately prepared for each learning input information, and this process is continued until each total input sum is converged by the iterative learning. The connection coefficient is determined, if necessary, from the total input sum determined for each learning input information separately.

In order to determine the above-mentioned connection coefficient, the steepest descent method or the like is used to minimize the total sum of the total input sums.

With regard to the connection coefficient for connecting to the output layer, the square error term of the teacher data and output data is set to a value larger than the term reflecting the selection tendency of the connection coefficient, thereby improving the recognition ability.

Taking advantage of the fact that the degree of convergence is different between the total input sum and the connection coefficient in each layer, the number of learning cycles for each layer may be made variable, thereby to shorten the total learning time.

Figure 17:
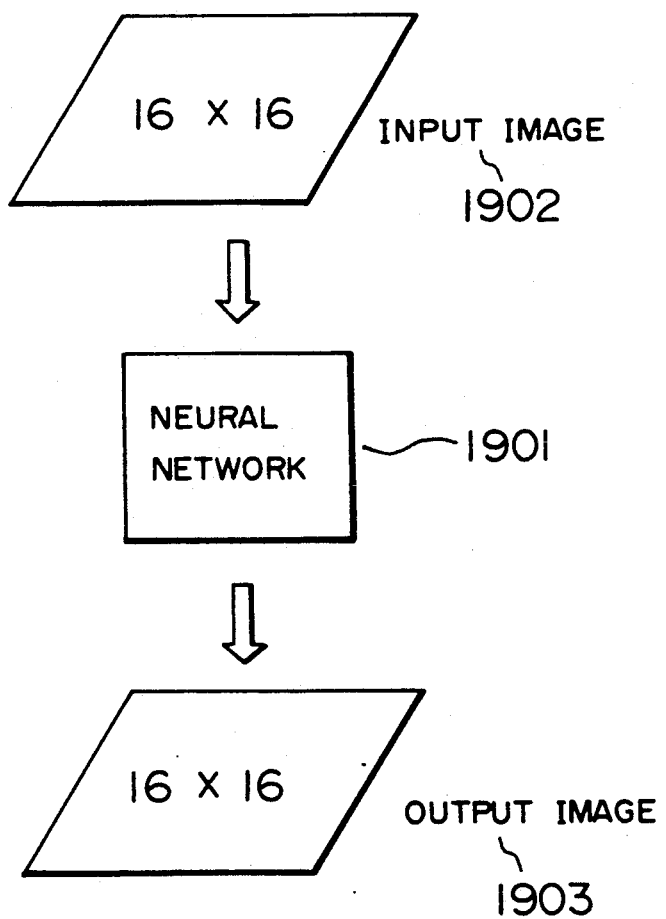
FIG. 17 is a diagram for explaining the learning process of neural network using noise data.

The result of a simulation test shows that the probabilistic back propagation method has the same effect of introduction of probability as the high-speed probabilistic learning method. Therefore, only the result of simulation of the former will be reported. Four appropriate figure patterns were prepared as learning input data. As shown in FIG. 17, the input image 1902 has 16×16 pixels, and so does the output image 1903. A neural network 1901 has 16×16 neurons in the output layer, 12×12 to 3×3 neurons in the intermediate layer, and 16×16 neurons in the input layer. The teacher pattern is the same as the input pattern, so that the output layer has the same scale as the input layer. All the neurons between layers are coupled to each other, and therefore the total number of connection coefficients is 73728 to 4608. T designates a variable, and $\eta(=0.5)$ is used as a coefficient. The learning was conducted in 1000 cycles for each learning pattern.

Figure 18A:
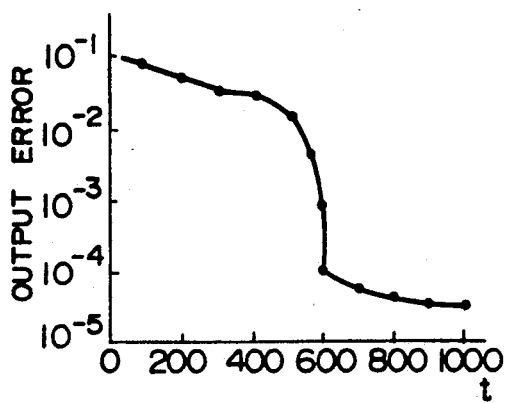
FIGS. 18A to 18E and 19A to 19F are diagrams showing the result of simulation of the learning process of the neural network using noise data.
Figure 18B:
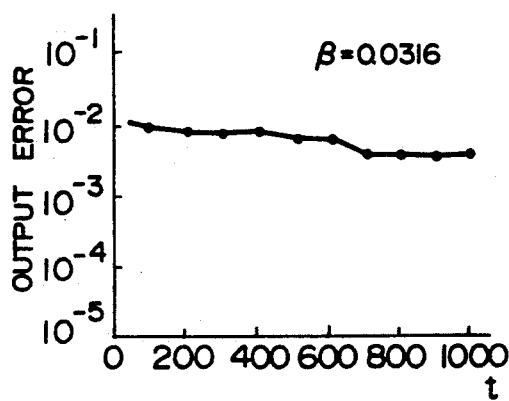
Figure 18C:
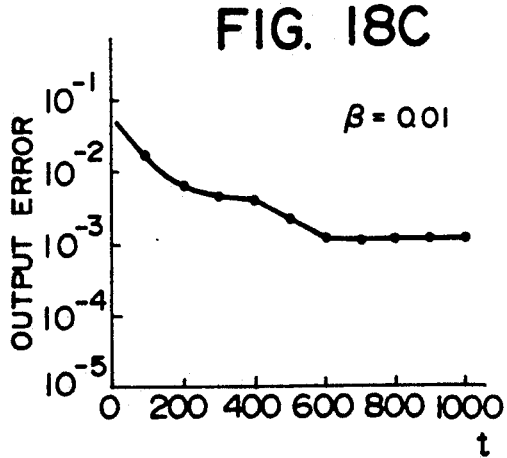
Figure 18D:
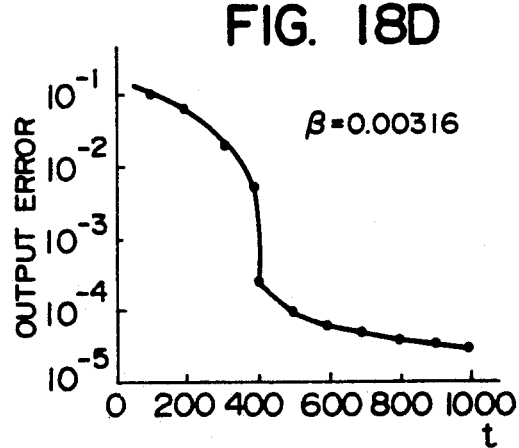
Figure 18E:
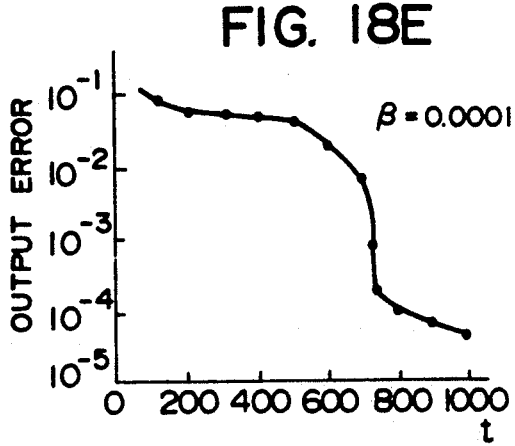

As shown in FIG. 18A, the first example shows a case where the intermediate layer has 12×12 neurons, i.e., where the convergence is readily achieved even in the back propagation method. The presence of a plateau (representing a state of protracted lack of fluctuations) in the output error abnormally lengthens the learning time. The initial value of the connection coefficient is a uniform random number of −0.01 to 0.01. An added white Gaussian noise has 0 as the average value and the deviation T, for which Geman's cooling schedule often used in the normal simulated annealing method was utilized (FIG. 15).

$$T = \beta^2 / \log(1+t) \qquad (18)$$

where t is the number of learning cycles. As shown in FIG. 18B, when the value $\beta$ is a large value like, for example, 0.0316, the connection coefficient is dominated by the additional noise, thereby resulting in the learning meaningless. When the value $\beta$ is too small like 0.0001, as shown in FIG. 18E, the probabilistic learning loses its meaning, so that the result is substantially the same as that of the conventional back propagation method. When the value $\beta$ is 0.001 (random number as much as about 10% of the initial value), the number of learning cycles until the convergence is reduced to about one half, and the effect of an external random number is represented. When the value $\beta$ is further increased to, for example, 0.01 (random number corresponding to approximately 50% of the initial value), as shown in FIG. 18C, although the convergence of only up to $10^{-3}$ is achieved, the convergence process is significantly different. Thus, the initial plateau can be avoided. A similar result can be obtained from such other cooling schedule as $T=\beta^2/t$ or $$T = \frac{\beta^2}{\sqrt{t}},$$

for example.

Figure 19A:
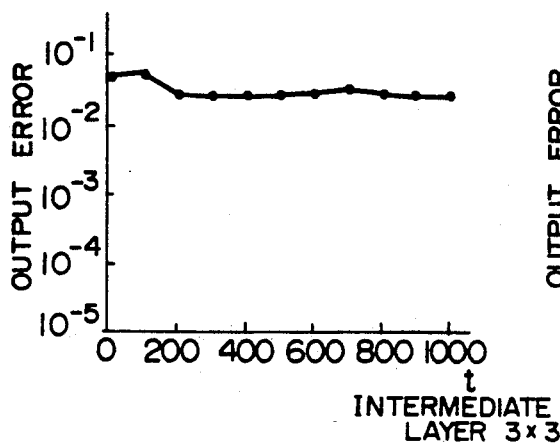
Figure 19B:
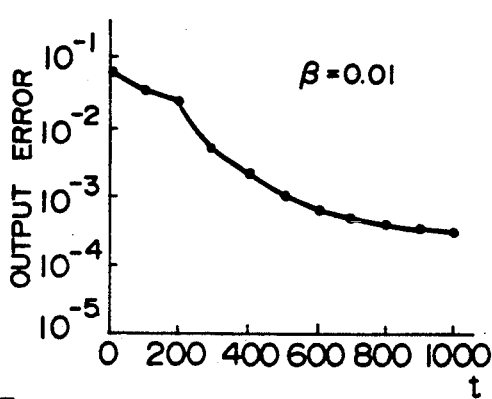
Figure 19C:
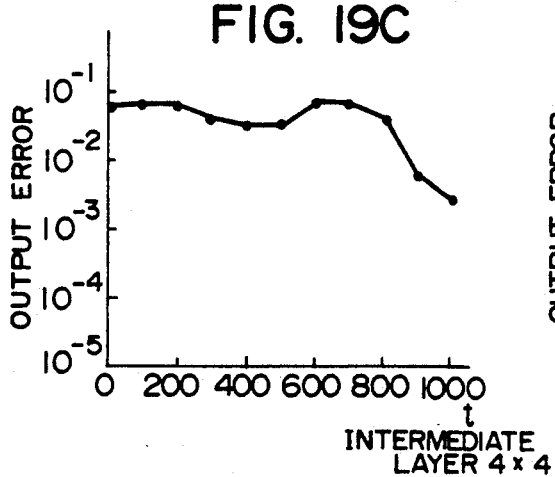
Figure 19D:
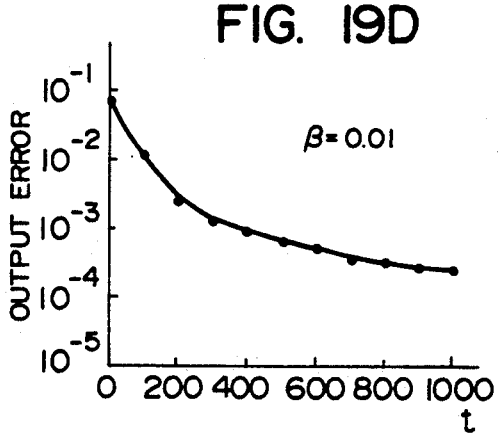
Figure 19E:
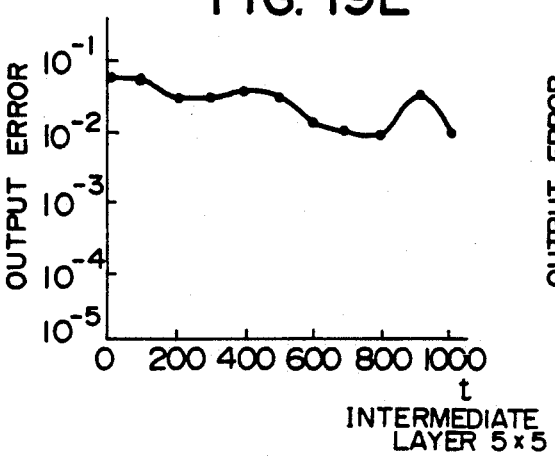
Figure 19F:
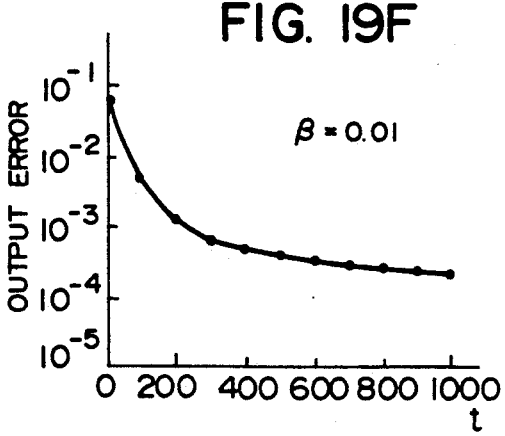

The examples described below refers to cases in which the convergence cannot be substantially attained by the back propagation method, i.e., a case in which the intermediate layer has neurons of 5×5 to 3×3. FIGS. 19A, 19C and 19E show fluctuations of the output error in relation to the number of learning cycles. As will be seen, the convergence of only up to about $10^{-2}$ is attained for t of 1000. Especially, when the intermediate layer has 3×3 neurons, as shown in FIG. 19A, the convergence cannot be achieved. Although the conditions are identical to those in the above-mentioned case other than the size of the intermediate layer, since the number of neuron in the intermediate layer has been limited, redundant connection coefficients are reduced, so that the learning is made difficult. In these examples, when the noise adding technique of the present invention is applied, using the cooling schedule of $T=0.01^2/\log(1+t)$, the output errors can be decreased to $10^{-4}$, as shown in FIGS. 19B, 19D and 19F. Assuming a general case, a neural network can be configured naturally without being troubled with the initial value setting.

Another embodiment of an information synthesizing unit will be explained below. It was described above that the relation logic, i.e., the value $\alpha$ from the logic generating unit gives a satisfactory result for a comparatively short-term prediction. However, in view of the fact that the value $\alpha$ is also dependent on time, it is difficult to use the value $\alpha$ for long-term prediction. In such a case, it is necessary to determine the value $\alpha$ adapted for a prediction period by use of learning data (naturally different from the learning data for the neural network group). This embodiment is provided for such a purpose.

In this embodiment, homogeneous or heterogenous input data group is simultaneously and synchronously input and the data group or the relation thereof is rendered to correspond to external or internal information in a multiple-to-single manner. In a neural network which is configured of threshold value logic elements each having multiple inputs and a single output each of the data group is input to an input layer of the network in a manner not doubling with each other, and is propagated in a predetermined direction. Information corresponding to the data group is output from the output layer the connections between neurons are corrected in such a manner that the output information matches to external or internal information.

The neural network can be used in place of the neural network group. In such a case, feature data may be sequentially and synchronously input to the input layers, respectively.

Each neuron processes data corresponding to any of the feature data, with the result that all the feature data are always processed parallelly by the neural network as a whole. The process for processing only particular feature data is equivalent to the process for propagating the feature data from the input layer to the output layer in the multilayer neural network shown in FIG. 4. By correcting the connections between neurons, therefore, output data corresponding to the feature data and information provided externally or internally are mapped in one-to-one correspondence relationship. The output data is composed of an output data group corresponding to the input data group and relation data between the input data. Therefore, simultaneously with the recognition of each input data, the relation between input data can be also recognized. Even where given input data is so deteriorated as to be unrecognizable by a noise or the like, a recognition rate of particular input data is improved by use of the relation data.

Figure 20:
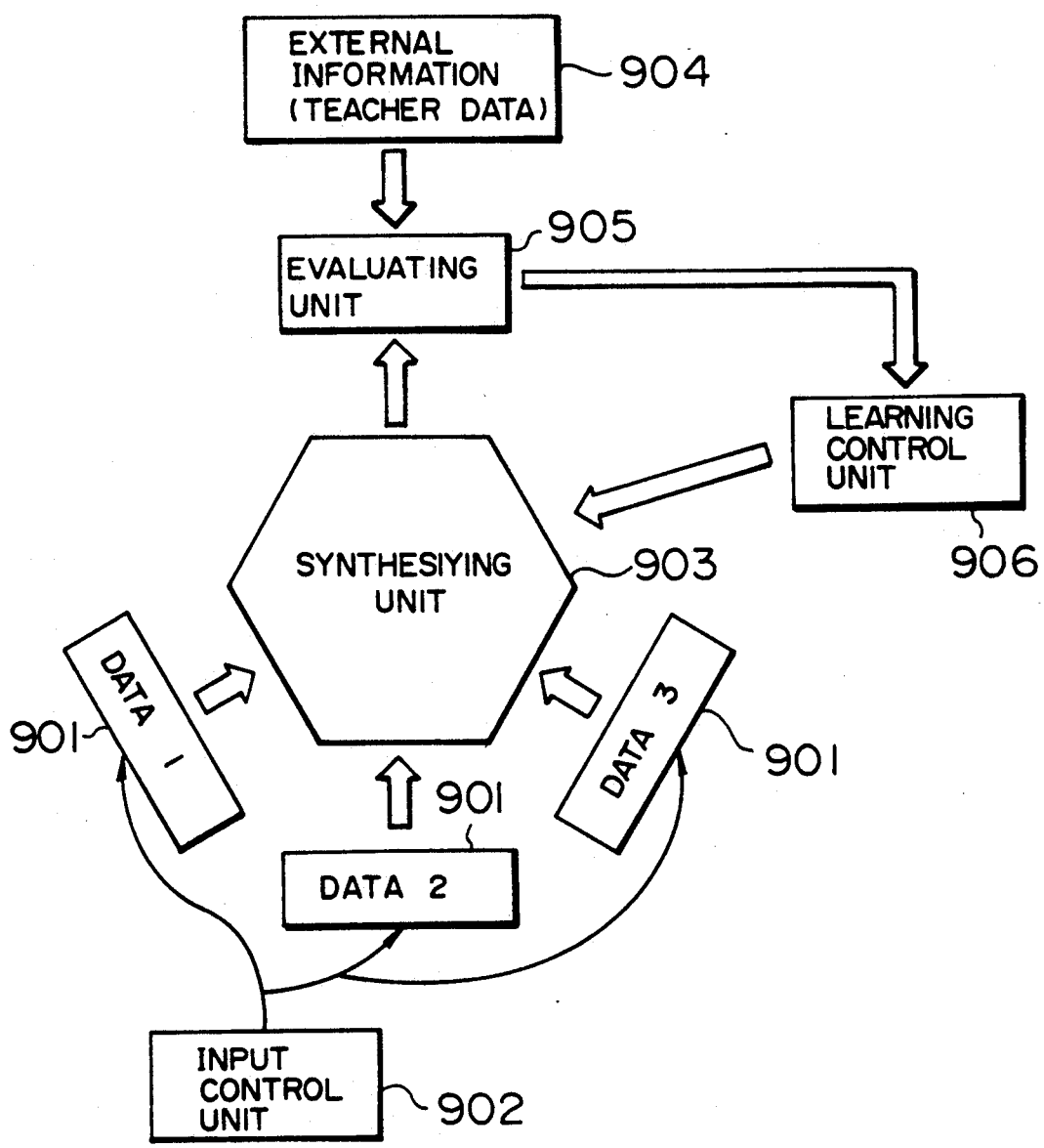
FIG. 20 is a block diagram showing a configuration of another example of the information synthesizing unit.

In an operation of the embodiment as the information synthesizing unit shown in FIG. 20, the input data group (learning data group) 901 are input to the input layers of the synthesizing unit 903 so designated as prevent the doubling. Each data is input in order designated for each learning cycle in synchronism with input control clock supplied from the input control unit 902. An output of the neural network corresponding to the input data is supplied to an evaluating unit 905, where it is evaluated to be compared with external information (a value β). On the basis of the result of evaluation, the synthesizing unit 903 is caused to learn by the learning unit 906, so that a coefficient of each synapse connection of the neural network is appropriately changed. When predicrion data is input in the execution mode, a predicted value α is output from the unit 903 to the synthesizing controller 52a in FIG. 5.

However, when data supplied as the external information is final prediction learning data, only this network unit may be used in place of circuit units shown in FIG. 5.

Figure 21:
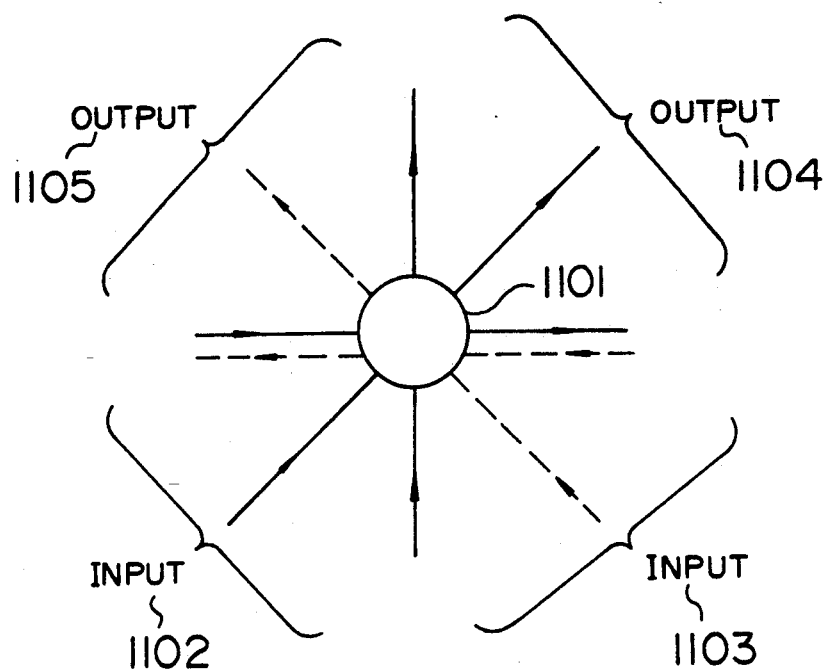
FIG. 21 is a diagram for explaining a neuron of multi-input type.

FIG. 21 shows the input-output relationship of each neuron 1101. In accordance with the direction of each data input to the neural network, an output 1104 is output in correspondence with an input 1102, and an output 1105 in correspondence with an input 1103. Each neuron is adapted to process only specified data in some cases or process complicated data in a predetermined sequence or in parallel as shown in FIG. 20 in other cases, depending on the position thereof in the neural network.

Figure 22:
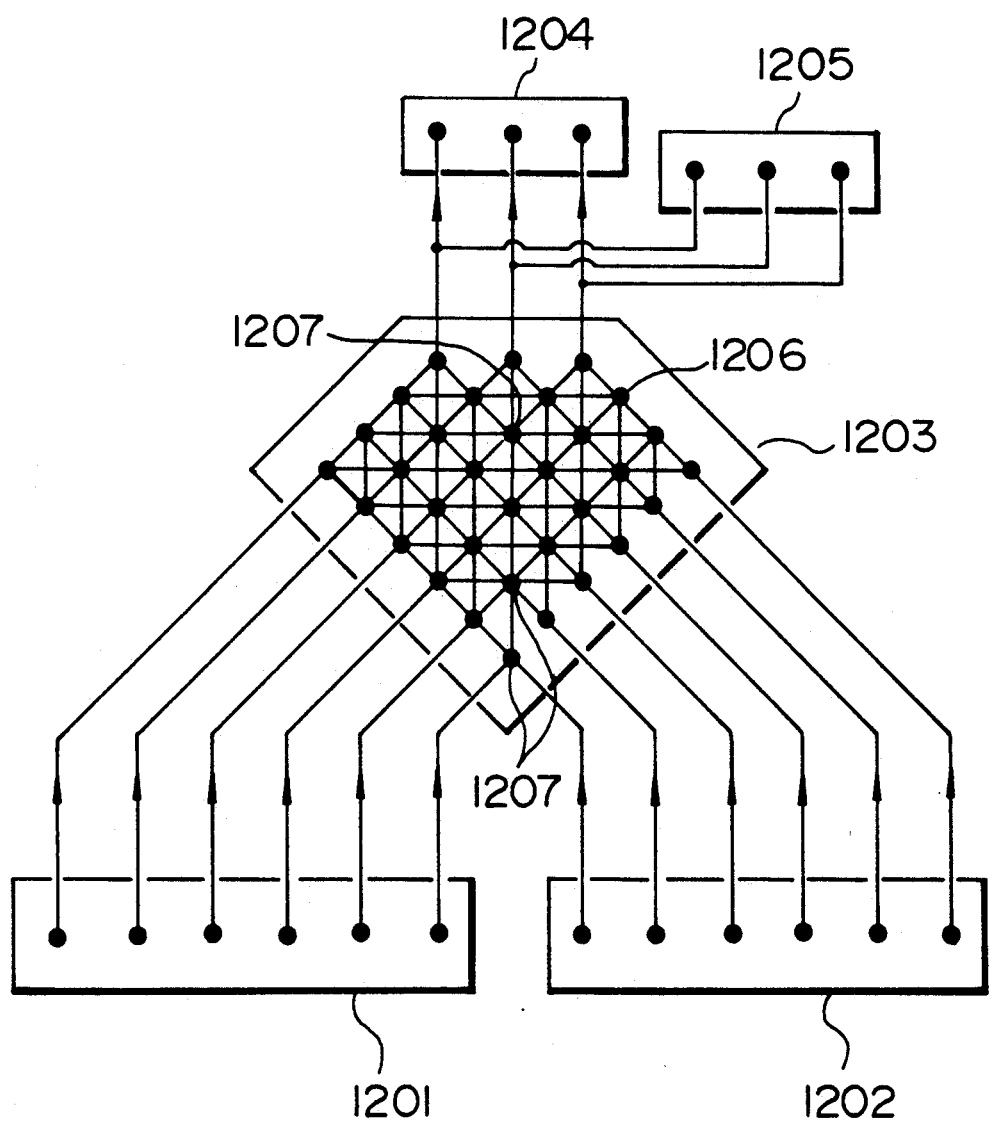

An operation of this system will be explained with reference to a case in which two input data are involved as shown in FIG. 22. The input data 1201, 1202 are expressed as states of a plurality of neurons, and each of the values is supplied to neurons located at the end of the neural network 1203. The neural network is so configured as to connect threshold value logic elements 1206 to each other as required. A feature of the configuration of this neural network is that when neurons are viewed only from the standpoint of the neurons for processing each data, they make up the neural network of a multilayer structure. As a whole, therefore, the neural network as shown in FIG. 22 is configured as a combination of a plurality of multilayer neural networks corresponding to respective data. It is thus possible to distributedly store the correspondence between the input data 1201 and the corresponding output data 1204 in the connection coefficients between the neurons. In similar fashion, the relation with the output data 1205 corresponding to the other input data 1202 may also be stored. Another feature of the neural network 1203 according to the present invention lies in that the relation between features of the data can be stored by elements 1207 associated with the position of contact with the multilayer neural network corresponding to each data.

Figure 23:
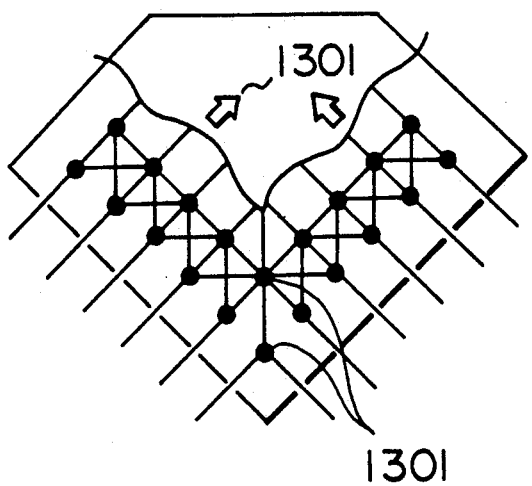
FIGS. 22, 23 and 24 are diagrams for explaining the neural network of multi-input type.

FIG. 23 shows a processing operation of each input data. If the relation between data is disregarded (by ignoring the neurons 1301), all the input data can be processed in parallel, and therefore high-speed processing is made possible regardless of the number of input data. When the neurons 1301 is taken into consideration, however, the data associated therewith is required to be processed at the same time. The data are therefore input synchronously. By doing so, the coexistence of input data can be avoided as only one of the input data is being processed at a given time point.

When a graph is plotted with each output data or information associated therewith along the abscissa and the recognition rate of the respective data along the ordinate, it is possible to express the ambiguity about the relation between data, and also to decide on the data relation mechanically or by dialogue through a man-machine interface by comparing with a predetermined function expressing ambiguity.

Figure 24:
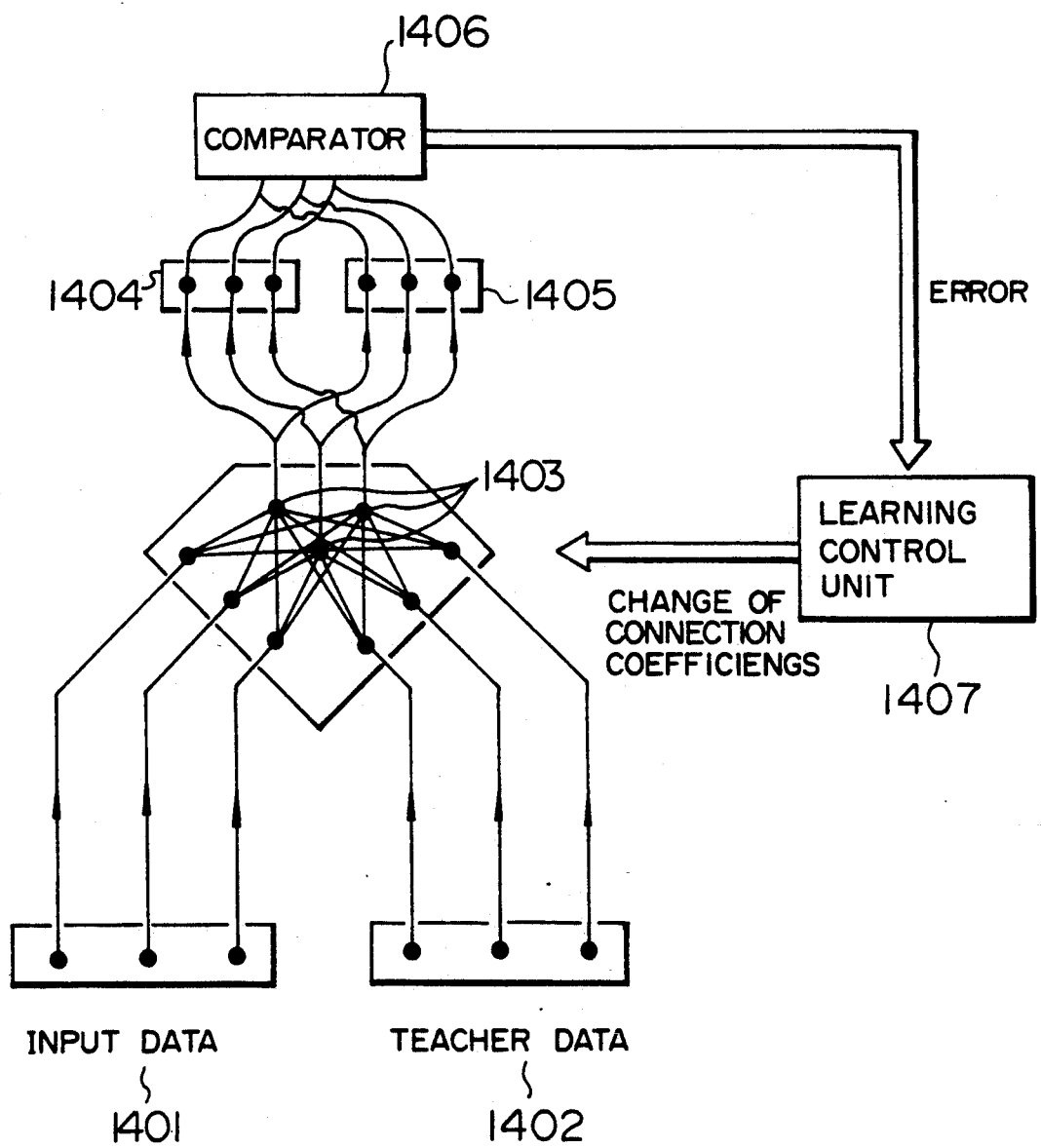
Figure 26:
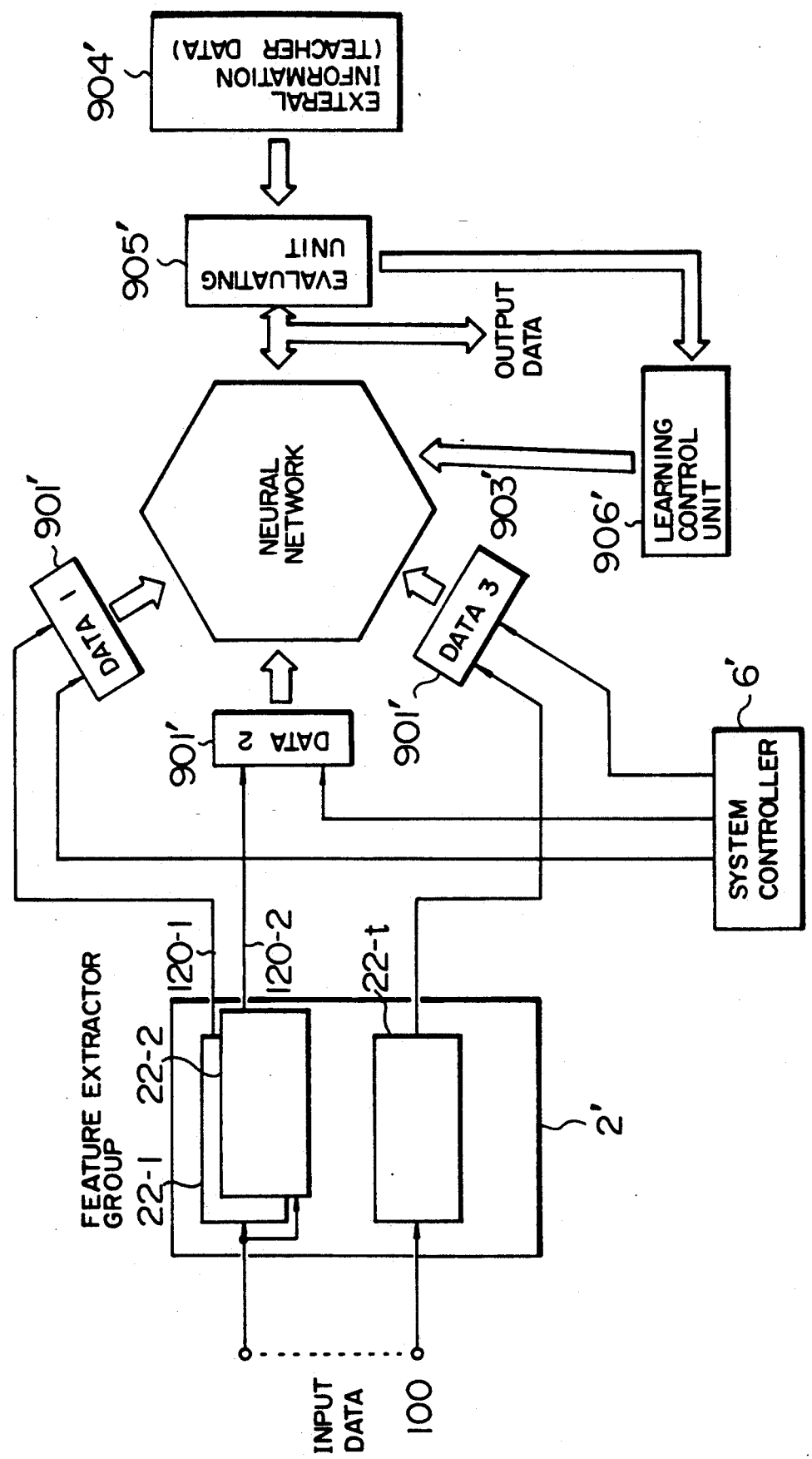
FIG. 26 us a block diagram showing a configuration of another example of the neural network system according to the present invention.

The learning in the neural network is to store the mapping relation between the input data and the teacher data as values of connections coefficient between neurons. In the back propagation method widely used, the connection coefficient is corrected in such a manner that the square error between the output data obtained from the given input data and the teacher data becomes zero. According to the method of learning of the invention, as shown in FIG. 24, the input data 1401 and the teacher data 1402 are input in synchronism with each other. Output data 1404 and 1405 corresponding to the respective data are output from output elements 1403 of the neural network to a comparator 1406. The output elements exactly correspond to the neurons of the intermediate layer in a conventional multilayer neural network for learning.

Each connection coefficient is corrected by a learning unit 1407 in such a manner that the output data 1404 and 1405 generated from the input data 1401 and the teacher data 1402 become equal to each other. In this way, the input data 1401 may be rendered to correspond to the teacher data 1402 in one-to-one correspondence relationship, thus making possible the learning operation. In addition, unlike in the conventional methods, a high-speed learning process is made possible as synchronous operation is available. A specific process is shown in FIGS. 25A to 25D. The input data 1401 and the teacher data are applied to the neural network in synchronism with read signals, respectively. Each of the square error of the output data with respective data is converged to zero with the progress of learning, as shown in FIG. 25D.

A second embodiment of the neural network system will be explained below.

A feature extractor group 2' similar to the feature extractor group 2 is supplied with a learning data in a learning mode, thereby to extract a plurality of features, say, three features. The feature data representing the features thus extracted are supplied to different input layers 901' of the neural network 903', respectively. In the process, as in an example already explained, three learning data are synchronously supplied to a single neural network 903', and a single result is applied from the output layer to an evaluating unit 905'. The evaluating unit 905', which is also supplied with teacher data 904', compares the teacher data 904' with the output from the neural network, and the result of comparison is supplied to a learning control unit 906'. In accordance with the result of comparison, the learning control unit 906' controls the neural network 903'. In this example, a plurality of features are synthesized into a single feature and output, and the relation between the plurality of features is also stored in the neural network 903'.

In an execution mode, as in learning mode, the object data to be processed is applied to the feature extractor group 2' to extract three features. These features, as in the case of the learning data, are supplied to the neural network 903' for output prediction data. As explained above, this prediction data reflects the relation between the features, and therefore a result similar to that of the first embodiment can be obtained.

A learning algorithm making use of the back propagation with a noise added or the maximum principle may be used also with this network system. Further, when one of the output and input of the neural network is time series data, a feedback loop may be formed as in the first embodiment.

We claim:

1. A neural network system comprising:
   feature extracting means for i) extracting N heterogeneous learning feature data, where N is an integer greater than one, from each of M data sets, where M is a positive integer each of which includes at least one learning data in a learning mode and ii) extracting N heterogeneous object feature data from at least one object data to be processed, in an execution mode;
   a neural network including neurons and having N input layers and an output layer for learning a relation between each of the N learning feature data and a teacher data corresponding to the N learning feature data and a relation among the N learning feature data of each data set based on the N learning feature data of each set from said feature extracting means and a corresponding teacher data supplied thereto, in the learning mode, and for outputting a target data based on the learning result in response to input of the N object feature data from said feature extracting means in the execution mode, particular ones of said neurons being operatively coupled to the N input layers, respectively, such that the particular ones of said neurons can learn the relation among the N learning feature data; and,
   learning control means for substantially simultaneously supplying each set of the N learning feature data and a corresponding teacher data to said neural network and for controlling said neural network to learn the relations in the learning mode.

2. A neural network system comprising:
   a neural network, including N input layers where N is an integer greater than one and an output layer to which input data inputted to the N input layers are propagated, for receiving a learning data and a teacher data for learning in a learning mode and for outputting a target data based on the learning result in response to input of heterogeneous object data in an execution mode, the learning data comprising N heterogeneous learning patterns and the object data comprises N heterogeneous object patterns;
   supply means for simultaneously and respectively supplying to the N input layers of said neural network the learning data including the N heterogeneous learning patterns and the teacher data in the learning mode, and the object data including the N heterogeneous object patterns in the execution mode; and,
   learning control means for controlling the learning of said neural network while adding to weights of synapse connections between neurons in said neural network during the learning using noise data, having an intensity which is determined based on the number of prior-learned cycles, in the learning mode.

3. A neural network system according to claim 2, wherein said learning control means includes means for adding the noise data having an intensity based on a cooling schedule, said intensity decreasing in value as the number of prior-learned cycles increases.

4. A neural network system according to claim 2, wherein said learning control means includes:
   a noise array table storing a first noise intensity predetermined for each synapse connection of each neuron of said neural network;
   a noise cycle number table storing a second noise intensity determined based on the number of previously learned cycles; and
   means for generating and adding to the weight of each synapse connection, the noise data represented by a product of the first noise intensity of the noise array table and the second noise intensity of said noise cycle number table for the synapse connection.

5. A neural network system according to claim 2, wherein said neural network has two input layers and an output layer to which two data inputted to the two input layers are propagated respectively, and
   said supply means includes means for supplying the learning data and the teacher data to the two input layers at different timings, respectively, in the learning mode and the object data to one of the two input layers to which the learning data is supplied in the execution mode;
   said learning control means includes means for controlling the learning of said neural network, based on a difference between outputs respectively corresponding to the learning data and the teacher data from the output layer of said neural network in the learning mode.

6. A neural network system according to claim 2, wherein said learning control means comprises:
   means for setting an initial value of a coefficient of each synapse connection in said neural network;
   means for changing each synapse connection coefficient in accordance with the teacher data while in the learning mode; and
   repeating means for causing said changing means to operate until a difference between output data of said neural network and the teacher data is less than a predetermined value while feeding the difference back to the input layer of said neural network.

7. A neural network system according to claim 2, wherein
   said learning control means includes means for changing each synapse connection coefficient in accordance with a predetermined cost function being a sum of a function of the connection coefficient reflecting selection tendency of the connection coefficient providing a place of storage and a function providing the sum, for each input combination, a square error between the output at the output layer obtained from the sum of the products of the coefficients of synapse connection and each neuron condition and the teacher data.

* * * * *